(12) United States Patent
Suzuki

(10) Patent No.: US 10,133,255 B2
(45) Date of Patent: Nov. 20, 2018

(54) MOTOR CONTROLLER, MOTOR DRIVER, AND MOTOR DRIVING SYSTEM

(71) Applicant: Haruyuki Suzuki, Kanagawa (JP)

(72) Inventor: Haruyuki Suzuki, Kanagawa (JP)

(73) Assignee: RICOH COMPANT, LTD., Tokyo (JP)

( * ) Notice: Subject to any disclaimer, the term of this patent is extended or adjusted under 35 U.S.C. 154(b) by 0 days.

(21) Appl. No.: 15/637,192

(22) Filed: Jun. 29, 2017

(65) Prior Publication Data
US 2018/0011471 A1 Jan. 11, 2018

(30) Foreign Application Priority Data

Jul. 8, 2016 (JP) .................................. 2016-136397
Mar. 21, 2017 (JP) .................................. 2017-054899

(51) Int. Cl.
| G05B 19/40 | (2006.01) |
| G05B 19/25 | (2006.01) |
| H02P 8/16 | (2006.01) |
| H02P 8/22 | (2006.01) |
| H02P 8/18 | (2006.01) |

(52) U.S. Cl.
CPC ........... *G05B 19/40* (2013.01); *G05B 19/253* (2013.01); *H02P 8/16* (2013.01); *H02P 8/18* (2013.01); *H02P 8/22* (2013.01)

(58) Field of Classification Search
CPC . G05B 19/40; H02P 21/22; H02P 8/02; H02P 6/17
See application file for complete search history.

(56) References Cited

U.S. PATENT DOCUMENTS

| 2007/0040529 A1 | 2/2007 | Takebayashi et al. |
| 2010/0117576 A1 | 5/2010 | Shimizu |
| 2010/0188031 A1 | 7/2010 | Shimizu |

(Continued)

FOREIGN PATENT DOCUMENTS

| DE | 102008026669 A1 | 12/2009 |
| EP | 2689529 A2 | 1/2014 |

(Continued)

OTHER PUBLICATIONS

Rusu, C. et al., "Model based design controller for the stepper motor," IEEE, May 22, 2008.
Extended European Search Report dated Dec. 12, 2017.

*Primary Examiner* — Karen Masih
(74) *Attorney, Agent, or Firm* — Harness, Dickey & Pierce, P.L.C.

(57) ABSTRACT

A novel motor controller controls a stepping motor and includes a command value calculator to calculate and output a speed command value and an angle command value based on a reference clock. A control method selector is included to select one of the open-loop control and the closed-loop control in accordance with the speed command value. A command value output unit is included to output a first target value as the first current command value when the open-loop control is selected and outputs a second target value as the second current command value when the closed-loop control is selected. The motor controller controls the stepping motor based on the first target value when the open-loop control is selected and the second target value when the closed-loop control is selected.

20 Claims, 19 Drawing Sheets

(56) References Cited

U.S. PATENT DOCUMENTS

| | | |
|---|---|---|
| 2011/0089874 A1 | 4/2011 | Shimizu |
| 2012/0068643 A1 | 3/2012 | Suzuki |
| 2012/0306419 A1 | 12/2012 | Suzuki |
| 2013/0106326 A1 | 5/2013 | Kamatani et al. |
| 2013/0106327 A1 | 5/2013 | Kamatani et al. |
| 2013/0257341 A1 | 10/2013 | Suzuki et al. |
| 2016/0056743 A1 | 2/2016 | Suzuki et al. |
| 2016/0065109 A1 | 3/2016 | Yamamoto et al. |
| 2016/0149443 A1 | 5/2016 | Hashimoto et al. |
| 2017/0063264 A1 | 3/2017 | Suzuki |
| 2018/0013363 A1 * | 1/2018 | Yamamoto ............... H02P 8/02 |

FOREIGN PATENT DOCUMENTS

| | | |
|---|---|---|
| JP | 2010-051125 | 3/2010 |
| JP | 2011-067063 | 3/2011 |
| JP | 2011-139583 | 7/2011 |
| WO | WO-2012131344 A2 | 10/2012 |

\* cited by examiner

MOTOR CONTROLLER, MOTOR DRIVER, AND MOTOR DRIVING SYSTEM

CROSS-REFERENCE TO RELATED APPLICATIONS

This patent application is based on and claims priority pursuant to 35 U.S.C. § 119(A) to Japanese Patent Application Nos. 2016-136397, filed on Jul. 8, 2016, and 2017-054899, filed on Mar. 21, 2017 in the Japan Patent Office, the entire disclosures of which are hereby incorporated by reference herein.

BACKGROUND

Technical Field

Embodiments of the present disclosure relate to a motor controller, a motor driver, and a motor driving system.

Related Art

A known stepping motor includes two-phase coils and a magnetized rotor. In this stepping motor, when driving currents having different phases by an angle of 90 degrees are supplied to the two-phase coils and the phases of the driving currents are advanced, the rotor rotates to follow the phases of the driving current. Hence, driving of the stepping motor can be precisely controlled by open-loop control, in which a sensor, such as an encoder, etc., is not needed.

However, with the open-loop control, when driving currents having a constant amplitude are supplied to the coils regardless of a load and a driving speed, there is a risk that the rotor does not follow the phase of the driving current and gets out-of-step when driven at a high speed or with a large load. In addition, when the motor is driven at a low speed or with a small load, electrical efficiency decreases.

A closed-loop control method has been proposed as an alternative to the above-described open-loop control method. In the closed-loop control, based on a voltage induced in a coil, an angle of a rotor is estimated and a driving current is controlled based on the estimated angle of the rotor. According to the closed-loop control, the motor can be highly accurately controlled while reducing power consumption when driven at high speed or with large loads.

However, when the motor is driven at a low speed, it is difficult to drive the motor stably since a voltage induced at the time is relatively small.

SUMMARY

One aspect of the present disclosure provides a novel motor controller for controlling a stepping motor. The motor controller includes a command value calculator to calculate and output a speed command value and an angle command value based on a reference clock. The motor controller also includes a control method selector to select one of the open-loop control and the closed-loop control in accordance with the speed command value. The motor controller further includes a command value output unit to output a first target value as the first current command value when the open-loop control is selected, and output a second target value as the second current command value when the closed-loop control is selected. The motor controller controls the stepping motor based on the first target value when the open-loop control is selected and the second target value when the closed-loop control is selected.

Another aspect of the present disclosure provides a novel motor driver that includes the motor controller and an inverter connected to the motor controller to supply a driving current output from the motor controller to a stepping motor connected to the inverter. The motor driver also includes a current detector to detect the driving current output from the inverter.

Yet another aspect of the present disclosure provides a novel motor driving system that includes the motor driver and a stepping motor driven by the driving current output from the motor driver.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
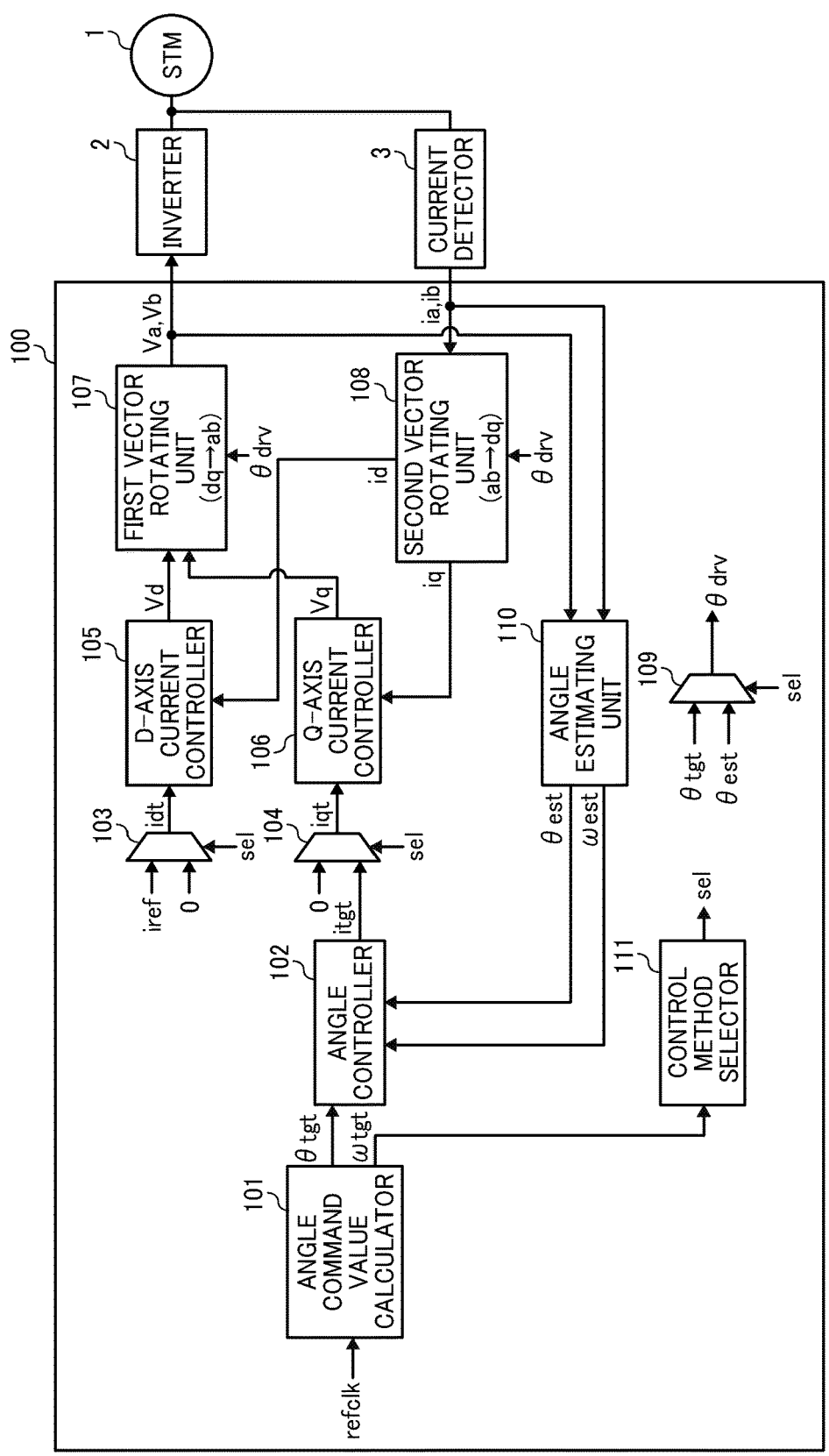
FIG. 1 is a diagram illustrating a configuration of an exemplary motor driving system according to a first embodiment of the present disclosure.

Referring now to the drawings, wherein like reference numerals designate identical or corresponding parts throughout the several views thereof, and in particular to FIGS. 1 to 13, an exemplary motor driving system according to a first embodiment of the present disclosure is described.

FIG. 1 illustrates an exemplary motor driving system according to the first embodiment of the present disclosure. The motor driving system of FIG. 1 includes a (stepping) motor (STM) 1, an inverter 2, a current detector 3, and a motor controller 100. The inverter 2, the current detector 3, and the motor controller 100 collectively constitute the motor driving system to drive the motor 1.

The motor 1 is driven by an alternating current having two phases mutually different by an angle of 90 degrees. These phases of the motor 1 are hereinafter referred to as an A-phase and a B-phase, respectively. Hence, the motor 1 is a typical two-phase stepping motor (STM) but is not limited thereto.

Figure 2:
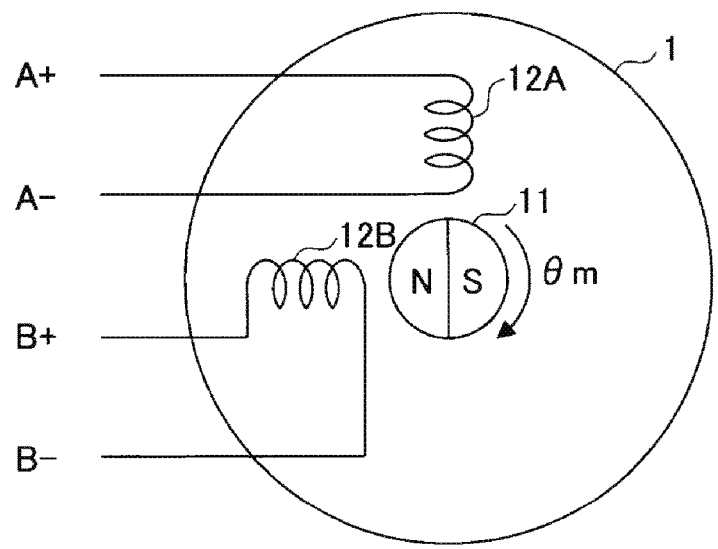
FIG. 2 is a diagram schematically illustrating an exemplary motor according to the first embodiment of the present disclosure.

FIG. 2 illustrates one example of the motor 1. As illustrated in FIG. 2, the motor 1 includes a rotor 11, an A-phase coil 12A, and a B-phase coil 12B. The rotor 11 is composed of either a permanent magnet arranged in a circumferential direction or a magnetic body magnetized in the circumferential direction. The rotor 11 has p-pairs of poles (i.e., pairs of S pole and N pole). In the example of FIG. 2, the number p of the pairs of poles is one. Hereinafter, an actual angle (i.e., a position) of the rotor 11 is referred to as a true angle $\theta m$.

Also, an angle increasing from zero to 360 degrees (i.e., one cycle) per one revolution of the rotor 11 is hereinafter referred to as a mechanical angle. An angle increasing from zero to p times of 360 degrees (i.e., p cycles) per one revolution of the rotor 11 is hereinafter referred to as an electrical angle. Hence, the electric angle is p times of the mechanical angle.

Herein below, unless otherwise stated, a speed and an angle of the rotor 11 are represented by the electrical angles, respectively. Further, the true angle $\theta m$ is the electrical angle again.

The A-phase coil 12A and the B-phase coil 12B are independent of each other (i.e., not connected to each other) and phases of these coils 12A and 12B are shifted by an angle of 90 degrees from each other. Herein below, voltages of these two terminals of the A-phase coil 12A are referred to as terminal voltages A+ and A−, respectively. Voltages of two terminals of the B-phase coil 12B are referred to as terminal voltages B+ and B−, respectively, as well. Hence, by letting alternating currents flow through the A-phase coil 12A and the B-phase coil 12B in different phases by the angle of 90 degrees, respectively, the rotor 11 accordingly rotates.

The inverter 2 is a circuit that supplies a driving current I to the motor 1 in accordance with a voltage command value input from the motor controller 100. The inverter 2 is composed of a pulse width modulating (PWM) circuit (i.e., a control signal generating unit) or a driver circuit and the like. Alternatively, the PWM circuit can be provided in the motor controller 100.

The inverter 2 converts an a-axis voltage command value Va input from the motor controller 100 into terminal voltages A+ and A−, and applies the converted terminal voltages A+ and A− to the terminals of the A-phase coil 12A, respectively. Specifically, the PWM circuit produces a control signal (e.g., a pulse signal) in accordance with the a-axis voltage command value Va and inputs the control signal to the driver circuit. The driver circuit applies the terminal voltages A+ and A− to the terminals of the A-phase coil 12A, respectively, in accordance with the control signal. A difference between these terminal voltages A+ and A− serves as a voltage across the terminals of the A-phase coil 12A, which causes an A-phase driving current Ia to flow in the A-phase coil 12A in accordance with the a-axis voltage command value Va. The a-axis voltage command value Va is an a-axis component of a driving voltage and is equivalent to a driving voltage value of the A-phase coil 12A. Here, the voltage that can be applied by the inverter 2 across the terminals of the A-phase coil 12A is less than a power supply voltage Vcc applied to the inverter 2.

The inverter 2 also converts a b-axis voltage command value Vb input from the motor controller 100 into terminal voltages B+ and B−, and applies the terminal voltages B+ and B− to terminals of the B-phase coil 12B, respectively. Specifically, the PWM circuit (in the inverter 2) produces a control signal (e.g., a pulse signal) in accordance with the b-axis voltage command values Vb and inputs the control signal into the driver circuit. Then, the driver circuit applies the terminal voltages B+ and B− in accordance with the control signal to the terminals of the B-phase coil 12B, respectively. A difference between these terminal voltages B+ and B− is the voltage across the terminals of the B-phase coil 12B. Hence, due to application of the above-described voltage across the terminals, a B-phase driving current Ib flows in the B-phase coil 12B in accordance with the b-axis voltage command value Vb. The b-axis voltage command value Vb is a b-axis component of the driving voltage and is equivalent to a driving voltage of the B-phase coil 12B. The voltage possible to be applied by the inverter 2 across the terminals of the B-phase coil 12B is less than the power supply voltage Vcc applied to the inverter 2.

The current detector 3 acting as a current sensor detects and converts a current value into a digital value and outputs the digital value. The current detector 3 is composed of a shunt resistance, a differential amplifier, and an AD (i.e., Analog to Digital) converter or the like.

Specifically, the current detector 3 detects and outputs an a-axis current value ia, which is a current value of the A-phase driving current Ia. The a-axis current value ia is an a-axis component of a detected value of a driving current I. The current detector 3 also detects and outputs a b-axis current value ib, which is a current value of the B-phase driving current Ib. The b-axis current value ib is a b-axis component of a detected value of the driving current I. These a and b-axes correspond to A and B-phases, respectively, as described later more in detail. These a-axis current value ia and b-axis current value ib output by the current detector 3 are input to the motor controller 100.

The motor controller 100 is composed of, e.g., a processor and a memory. The processor may be a central processing unit (CPU), a micro processing unit (MPU), or a digital signal processor (DSP) or the like. The processor may be an application specific integrated circuit (ASIC), a field programmable gate array (FPGA), or a programmable logic device (PLD) or the like. The processor runs programs stored in the memory.

The memory may be a dynamic random access memory (DRAM), a static random access memory (SRAM), a magnetic random access memory (MRAM), a flash memory, or the like. The memory stores programs run by the processor.

The motor controller 100 is implemented by an integrated circuit (IC) chip that includes a single or multiple processors and one or more memories, for example. The IC chip may include at least one of the inverter 2 and the current detector 3.

The motor controller 100 receives a reference clock refclk. The reference clock refclk is used to control the motor 1 and is equivalent to a pulse input to a conventional controller. The motor controller 100 controls the motor 1 by using two types of control methods (i.e., open-loop control and closed-loop control) based on the reference clock refclk.

The closed-loop control is a control method to control the motor 1 based on a current command value calculated based on a feedback control result (e.g., an angle and an angular speed of the rotor 11). When the motor 1 is controlled without using a sensor as in this embodiment of the present disclosure, the angle and the speed of the motor 1 cannot directly be obtained. Therefore, estimated values of the angle and the speed of the motor 1 are fed back in this embodiment of the present disclosure. With the closed-loop control, the motor 1 can be highly accurately controlled.

The open-loop control is a method of controlling the motor 1 based on a preset current command value. That is, different from the closed-loop control, the angle and the speed of the motor 1 are not fed back as control results in the open-loop control. However, with the open-loop control, the motor 1 can be controlled by a simple method.

As illustrated in FIG. 1, the motor controller 100 includes various functional configurations. That is, the motor controller 100 includes an angle command value calculator 101, an angle controller 102, a first selector 103, a second selector 104, a d-axis current controller 105, and a q-axis current controller 106. The motor controller 100 also includes a first vector rotating unit 107, a second vector rotating unit 108, a third selector 109, an angle estimating unit 110, and a control method selector 111. These functional configurations are implemented by a processor when the processor runs program.

The angle command value calculator 101 receives the reference clock refclk from an outside. The angle command value calculator 101 calculates and outputs an angle command value θtgt by integrating the reference clocks refclk. The angle command value θtgt is a target value of an angle of the rotor 11. The angle command value θtgt output by the angle command value calculator 101 is input to the angle controller 102 and the third selector 109.

The angle command value calculator 101 calculates and outputs a speed command values ωtgt by measuring (counting) a frequency of the reference clock refclk. The speed command value ωtgt is a target value of an angular speed of the rotor 11. The speed command value ωtgt output by the angle command value calculator 101 is input to the control method selector 111.

Figure 3:
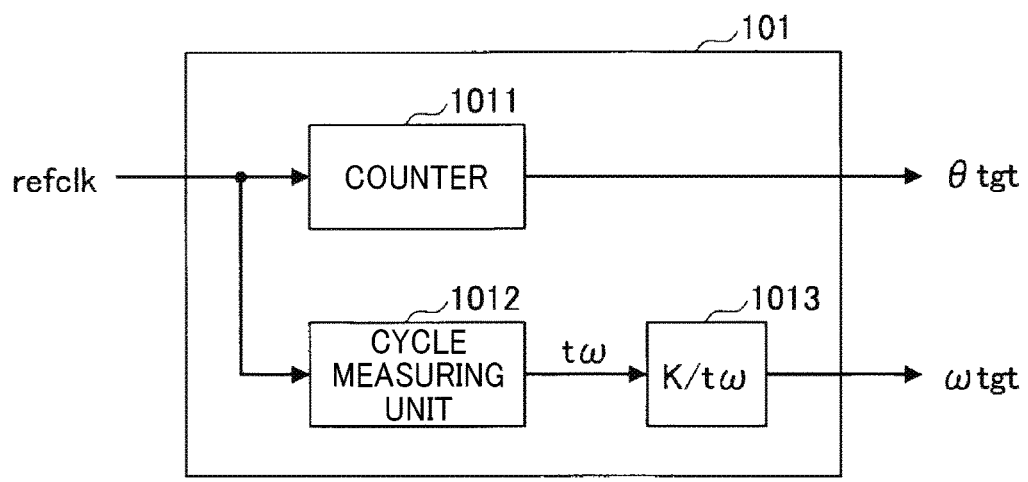
FIG. 3 is a diagram schematically illustrating an exemplary angle command value calculator according to the first embodiment of the present disclosure.

FIG. 3 illustrates an example of the angle command value calculator 101. The angle command value calculator 101 of FIG. 3 includes, e.g., a counter 1011, a cycle measuring unit 1012, and an inverse number calculator 1013.

The counter 1011 receives the reference clock refclk. The counter 1011 counts the number of reference clocks refclk and outputs a counted value as an angle command value θtgt. Such counting of the number of reference clocks refclk is equivalent to integration of the reference clocks refclk.

The cycle measuring unit 1012 receives the reference clock refclk. The cycle measuring unit 1012 measures and outputs a cycle tω of the reference clock refclk. The cycle tω can be obtained by measuring an interval of edges of the reference clocks refclk by using a clock with a fixed-frequency sufficiently faster than the reference clock refclk.

The inverse number calculator 1013 receives the cycle tω and calculates an inverse number of the cycle tω. The inverse number calculator 1013 multiplies the inverse number of the cycle tω by a coefficient K and outputs a product obtained in this way as a speed command value ωtgt. The coefficient K is a factor to convert the inverse number of the cycle tω into a value corresponding to the frequency of the reference clock refclk.

Alternatively, the angle command value calculator 101 can alternatively calculate the speed command value ωtgt by differentiating the angle command value θtgt. In such a situation, the angle command value calculator 101 can obtain the speed command value ωtgt by calculating a difference between angle command values θtgt at a given interval. The difference between the angle command values θtgt is equivalent to the speed command values ωtgt.

The angle controller 102 receives the angle command value θtgt, an angle estimated value θest, and the speed estimated value ωest. The angle estimated value θest is an estimated value of an angle of the rotor 11. The speed command value ωest is an estimated value of an angular speed of the rotor 11. A detailed description of the angle estimated value θest and speed command value ωest is deferred.

The angle controller 102 calculates and outputs a current command value itgt which renders the angle estimated value θest to match the angle command value θtgt. That is, the current command value itgt is a target value (i.e., a second target value) of a q-axis current command value iqt (i.e., a second current command value) used when the motor 1 operates in a closed-loop control mode in which closed-loop control is executed. The q-axis current command value iqt is a q-axis component (i.e., a torque component) of the driving current I.

Figure 4:
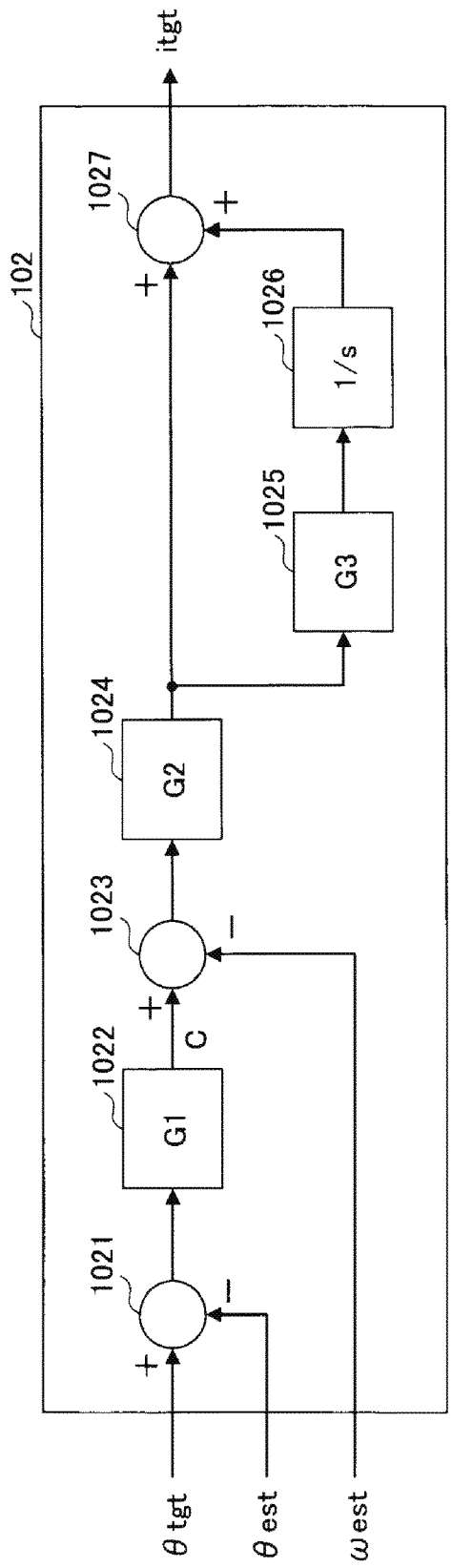
FIG. 4 is a diagram illustrating an exemplary angle controller according to the first embodiment of the present disclosure.

FIG. 4 illustrates an example of the angle controller 102. The angle controller 102 of FIG. 4 includes a comparator 1021, an amplifier 1022, another comparator 1023, multiple amplifiers 1024 and 1025, an integrator 1026, and an adder 1027.

The comparator 1021 receives the angle command value θtgt and the angle estimated value θest. The angle command value θtgt is a target value of angle control. The angle estimated value θest is a detected angle value in the angle control. The comparator 1021 calculates and outputs a difference between the angle command value θtgt and the angle estimated value θest. The difference output from the comparator 1021 enters (i.e., is input to) the amplifier 1022.

The amplifier 1022 amplifies the output of the comparator 1021 with a given gain G1 and outputs an amplified value obtained in this way. The output value of the amplifier 1022 corresponds to an operation amount of the angle control. The output value of the amplifier 1022 is herein below referred to as an operation amount C and obtained by the following formula:

$$C=G1\times(\theta tgt-\theta est).$$

The operation amount C is input to the comparator 1023.

The comparator 1023 receives the operation amount C and the speed estimated value ωest. The comparator 1023 calculates and outputs a difference between the operation amount C and the speed estimated value ωest. The speed estimated value ωest is a detected angle (value) in speed control (of the motor 1). The operation amount C is also a target value of the speed control. An output value of the comparator 1023 is input to the amplifier 1024.

The amplifier 1024 secondly amplifies the output value of the comparator 1023 with a given gain G2 and outputs a secondly amplified value obtained in this way. The secondly amplified value of amplifier 1024 is input to the amplifier 1025 and the adder 1027.

The amplifier 1025 thirdly amplifies the output value of the amplifier 1024 with a given gain G3 and outputs a thirdly amplified value obtained in this way. The thirdly amplified value of the amplifier 1025 is input to the integrator 1026.

The integrator 1026 integrates the thirdly amplified value of the amplifier 1025 and outputs an integrated result obtained in this way. The output value of the integrated result of the integrator 1026 is input to the adder 1055.

The adder 1027 adds the output value of the amplifier 1024 to the output value of the integrator 1026 and outputs an added result obtained in this way as a current command value itgt. The current command value itgt is an operation amount of speed control included in the angle control. The current command value itgt is represented by the following formula.

$$itgt=(C-\omega est)\times G2\times(1+G3\times 1/s) \quad \text{(Formula 1)}$$

In the angle controller 102 of FIG. 4, the loop of the speed control (i.e., the comparator 1023 and the amplifier 1024) is included inside the loop of the angle control. According to the configuration of FIG. 4, since the speed control loop acts as a phase advancing factor, a phase margin can be secured in the angle controller 102. In addition, since the angle controller 102 of FIG. 4 excludes a differential factor, the angle controller 102 is rarely affected by noise, thereby stably (or constantly) outputting the current command value itgt.

The angle controller 102 can be configured by excluding the speed control loop. In such a situation, the comparator 1023 and the amplifier 1024 are removed from such a system (i.e., the angle controller 102) of FIG. 4 and the output value of the amplifier 1022 is input to both the amplifier 1025 and the adder 1027.

Referring back to FIG. 1, the first selector 103 is one example of the command value output unit. The first selector 103 receives a current value 0 and a current value iref. The current value iref serves as a first pre-set target value of the d-axis current command value idt (i.e., a first current command value) when the open-loop control is executed. The d-axis current command value idt is a d-axis component (i.e., a magnetic flux component) of the driving current I.

The first selector 103 also receives a selecting signal sel. The selecting signal sel is composed of either 0 or 1 that represents a control method selected by a control method selector 111 as a result of selection. Herein below, it is premised that the control method selector 111 outputs 0 as the selecting signal set when the open-loop control is selected, and 1 as the selecting signal sel when the closed-loop control is selected. The selecting signal sel is described later more in detail.

The first selector 103 selects and outputs one of the current value 0 and the current value iref as the d-axis current command value idt in accordance with the selecting signal sel. The d-axis current command value idt output by the first selector 103 is input to the d-axis current controller 105.

Specifically, the first selector 103 selects the current value iref as the d-axis current command value idt when the selecting signal sel is the value 0 (i.e., the control method is the open-loop control). By contrast, the first selector 103 selects the current value 0 as the d-axis current command value idt when the selecting signal sel is the value 1 (i.e., the control method is the closed-loop control).

The second selector 104 is another example of the command value output unit. The second selector 104 receives the current command value itgt and a current value 0. The second selector 104 also receives a selecting signal sel. The second selector 104 selects and outputs one of the current values as a q-axis current command value iqt in accordance with the selecting signal sel. The q-axis current command value iqt output by the second selector 104 is input to a q-axis current controller 106.

Specifically, the second selector 104 selects the current value 0 as the q-axis current command value iqt when a value of the selecting signal sel is 0 (i.e., the control method is the open-loop control). By contrast, the second selector 104 selects the current command value itgt as the q-axis current command value iqt when a value of the selecting signal sel is 1 (i.e., the control method is the closed-loop control).

The d-axis current controller 105 receives a d-axis current value id and the d-axis current command value idt. The d-axis current value id is a d-axis component of the detected value of the driving current I. The d-axis current controller 105 controls and outputs a d-axis voltage command value Vd to render the d-axis current value id to match the d-axis current command value idt by applying PI (Proportional Integral) control or the like. The d-axis voltage command value Vd is a d-axis component of the voltage command value. The d-axis voltage command value Vd output by the d-axis current controller 105 is input to the first vector rotating unit 107.

Figure 5:
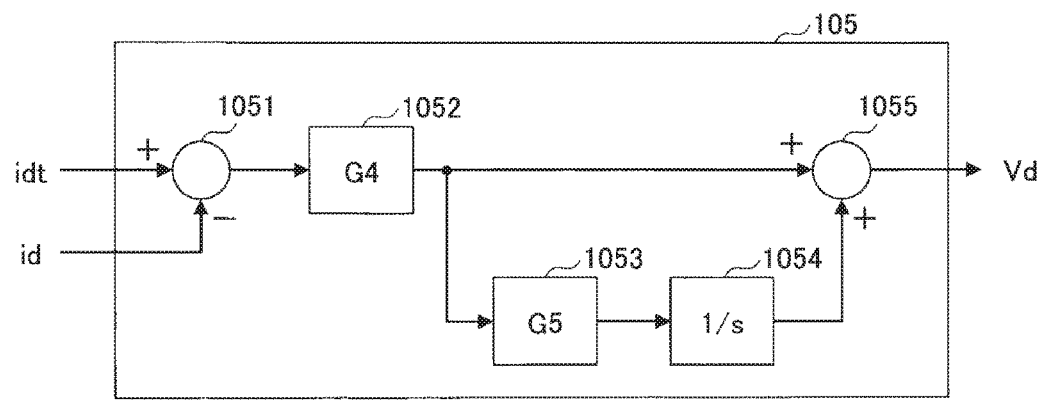
FIG. 5 is a diagram illustrating an exemplary d-axis current controller according to the first embodiment of the present disclosure.

FIG. 5 is a diagram illustrating one example of the d-axis current controller 105. The d-axis current controller 105 of FIG. 5 includes a comparator 1051, multiple amplifiers 1052 and 1053, an integrator 1054, and an adder 1055.

The comparator 1051 receives the d-axis current command value idt and the d-axis current value id. The comparator 1051 calculates and outputs a difference between the d-axis current command value idt and the d-axis current value id. An output value of the comparator 1051 output in this way is input to the amplifier 1052.

The amplifier 1052 amplifies the output of the comparator 1051 with a given gain G4 and further outputs an amplified value obtained in this way. An output value of the amplifier 1052 output in this way is input to the amplifier 1053 and the adder 1055.

The amplifier 1053 amplifies the output of the amplifier 1052 with a given gain G5 and outputs an amplified value obtained in this way. The output value of the amplifier 1053 is input to the integrator 1054.

The integrator 1054 integrates the output value of the amplifier 1053 and outputs an integrated value obtained in this way. The output value of the integrator 1054 is input to the adder 1055.

The adder 1055 adds the output value of the amplifier 1052 to the output value of the integrator 1054 and outputs an added output value obtained in this way as the d-axis voltage command value Vd. The d-axis voltage command value Vd is represented by the following formula.

$$Vd = (idt - id) \times G4 \times (1 + G5 \times 1/s) \quad \text{(Formula 2)}$$

Referring back to FIG. 1, the q-axis current controller 106 receives a q-axis current value iq and a q-axis current command value iqt. The q-axis current value iq is a q-axis component of the detected value of the driving current I. The q-axis current controller 106 controls the q-axis voltage command value Vq to render the q-axis current value iq to match the q-axis current command value iqt by using a PI control method or the like. The q-axis current controller 106 outputs a q-axis voltage command value Vq controlled in this way. The q-axis voltage command value Vq is a q-axis component of the voltage command value. The q-axis voltage command value Vq output by the q-axis current controller 106 is input to the first vector rotating unit 107.

Figure 6:
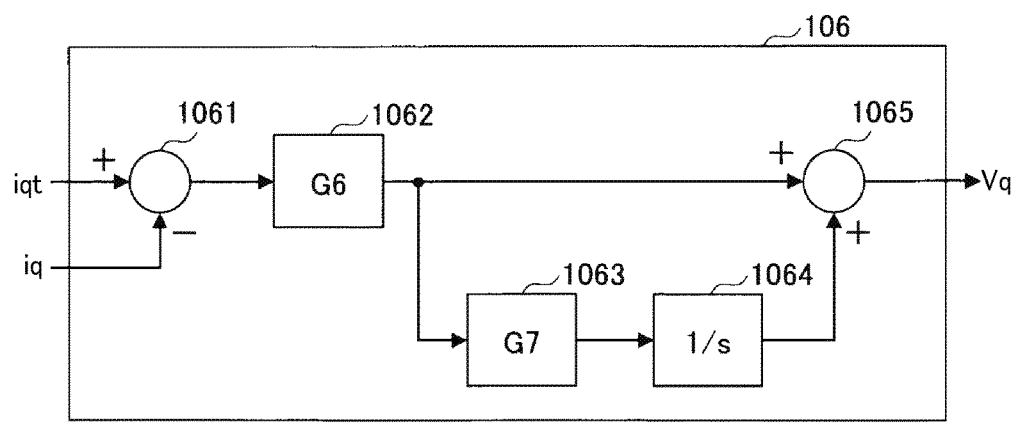
FIG. 6 is a diagram illustrating an exemplary q-axis current controller according to the first embodiment of the present disclosure.

FIG. 6 is a diagram illustrating an example of the q-axis current controller 106. The q-axis current controller 106 of FIG. 6 includes a comparator 1061, multiple amplifiers 1062 and 1063, an integrator 1064, and an adder 1065. These configurations are the same as those of the d-axis current controller 105 of FIG. 5, respectively. When the amplifiers 1062 and 1063 have gains G6 and G7, respectively, a q-axis voltage command value Vq is represented by the following formula.

$$Vq = (iqt - iq) \times G6 \times (1 + G7 \times 1/s) \quad \text{(Formula 3)}$$

With continued reference to FIG. 1, the first vector rotating unit 107 receives the d-axis voltage command value Vd, the q-axis voltage command value Vq, and a driving angle drv ($\theta$drv). The driving angle drv is a phase angle to convert a dq coordinate system into an ab coordinate system. The dq coordinate system is a rotary coordinate system composed of a d-axis corresponding to (or indicating) a magnetic flux component and a q-axis corresponding to (or indicating) a torque component. The ab coordinate system is a fixed coordinate system composed of an a-axis corresponding to the A-phase and a b-axis corresponding to the B-phase. An angle of the rotor 11 is equivalent to an angle of the d-axis to the a-axis. The driving angle drv is input from a third selector 109. The driving angle drv is described later more in detail.

By converting the dq coordinate system into the ab coordinate system, the first vector rotating unit 107 calculates an a-axis voltage command value Va and a b-axis voltage command value Vb based on the d-axis voltage command value Vd and the q-axis voltage command value Vq. The first vector rotating unit 107 outputs a calculated a-axis voltage command value Va and the b-axis voltage command value Vb obtained in this way. The a-axis voltage command value Va and the b-axis voltage command value Vb output by the first vector rotating unit 107 are input to the inverter 2 and an angle estimating unit 110.

Specifically, the first vector rotating unit 107 calculates the a-axis voltage command value Va and the b-axis voltage command value Vb by rotating a vector voltage composed of the d-axis voltage command value Vd and the q-axis voltage command value Vq by the driving angle drv. The a-axis voltage command value Va and the b-axis voltage command value Vb are represented by the following formulas, respectively.

$$Va = Vd \cos(\theta drv) - Vq \sin(\theta drv) \quad \text{(Formula 4)}$$

$$Vb = Vd \sin(\theta drv) - Vq \cos(\theta drv) \quad \text{(Formula 5)}$$

These formulas 4 and 5 are also represented by the following determinant.

$$\begin{bmatrix} Va \\ Vb \end{bmatrix} = \begin{bmatrix} \cos(\theta drv) & -\sin(\theta drv) \\ \sin(\theta drv) & \cos(\theta drv) \end{bmatrix} \begin{bmatrix} Vd \\ Vq \end{bmatrix} \quad \text{(Formula 6)}$$

Figure 7:
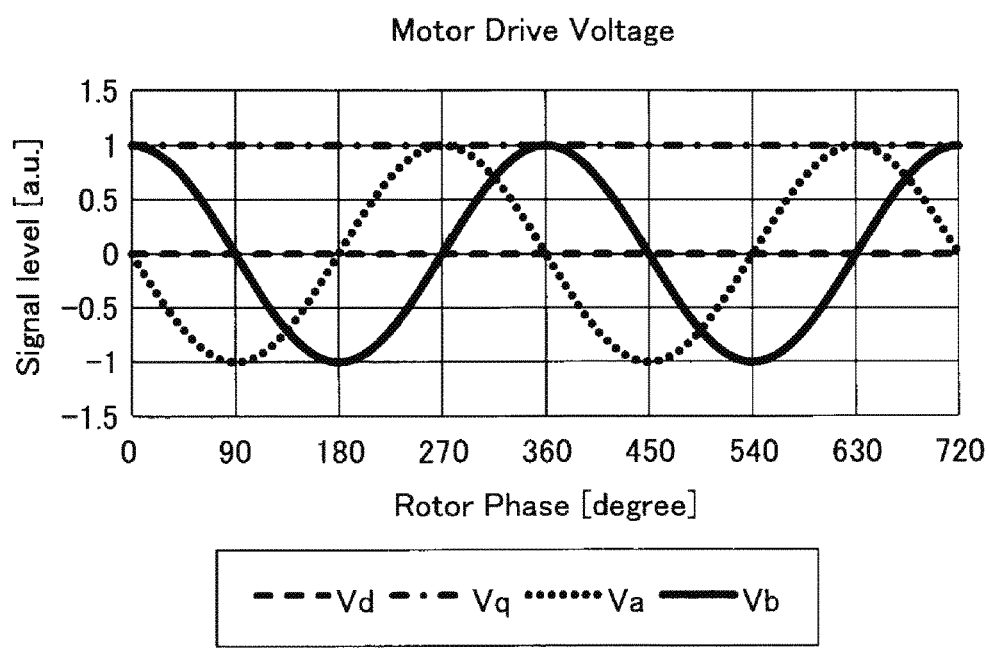
FIG. 7 is a graph illustrating an exemplary operation of a first vector rotating unit according to the first embodiment of the present disclosure.
Figure 8:
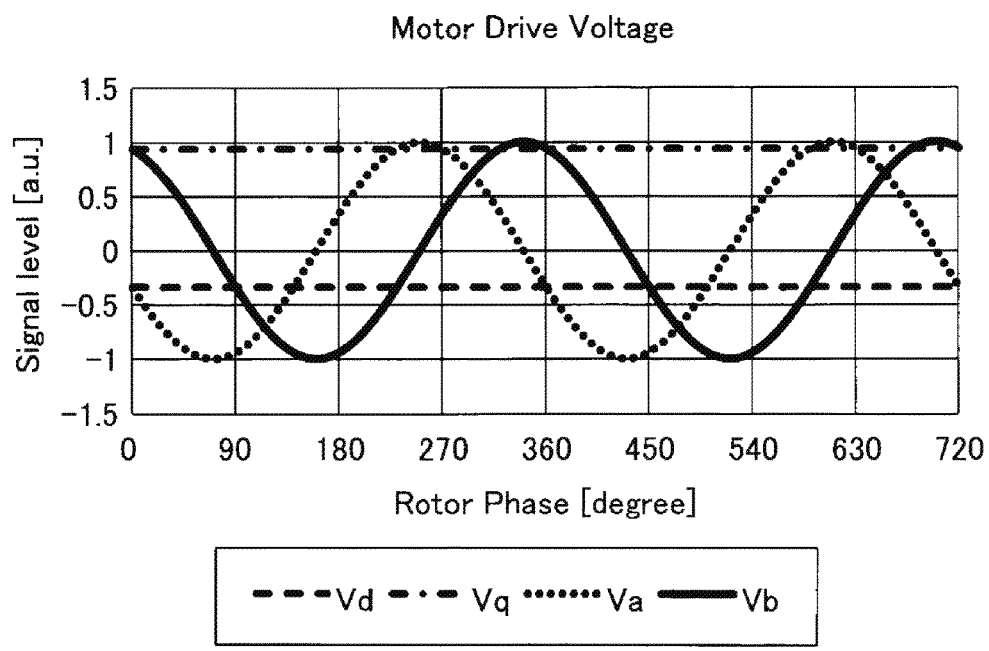
FIG. 8 is a graph illustrating another exemplary operation of the first vector rotating unit according to the first embodiment of the present disclosure.

FIGS. 7 and 8 are graphs illustrating exemplary operation of the first vector rotating unit 107. In FIGS. 7 and 8, a broken line indicates the d-axis voltage command value Vd. A one-point chain line indicates the q-axis voltage command value Vq. A dotted line indicates the a-axis voltage command value Va. A solid line indicates the b-axis voltage command value Vb. A vertical axis indicates a voltage level (i.e., a signal level) of an arbitrary unit [a. u.]. A horizontal axis indicates a true angle $\theta$m [degree] of the rotor 11. In the example described below, the closed-loop control is typically executed.

In the example of FIG. 7, the d-axis voltage command value Vd is zero (Vd=0). The q-axis voltage command value Vq is one (Vq=1). In such a situation, the amplitude of each of the a-axis voltage command value Va (i.e., $-\sin(\theta m)$) and the b-axis voltage command value Vb (i.e., $\cos(\theta m)$) becomes 1, and the phase of each of the a-axis voltage command value Va and the b-axis voltage command value Vb matches the true angle $\theta$m. By contrast, in an example of FIG. 8, the d-axis voltage command value Vd is $-0.342$, and the q-axis voltage command value Vq is 0.940. In such a situation, the amplitude of each of the a-axis voltage command value Va and the b-axis voltage command value Vb is 1, and the phase each of the a-axis voltage command value Va and the b-axis voltage command value Vb advances about 20 degrees from the true angle $\theta$m.

In this way, in accordance with the d-axis voltage command value Vd and the q-axis voltage command value Vq, the phases of the A-axis voltage command value Va and the B-axis voltage command value Vb vary, respectively. In this embodiment of the present disclosure, when a driving speed of the motor 1 increases, and the phase delays of the a-axis current value ia and the b-axis current value ib grow, the d-axis voltage command value Vd and the q-axis voltage command value Vq are controlled to advance the phases of the a-axis voltage command value Va and the b-axis voltage command value Vb. Hence, electrical efficiency can be maintained even when the drive speed increases.

With continued reference to FIG. 1, the second vector rotating unit 108 receives the a-axis current value ia, the b-axis current value ib, and a driving angle drv ($\theta$drv). The second vector rotating unit 108 calculates and outputs a d-axis current value id and a q-axis current value iq based on the a-axis current value ia and the b-axis current value ib by converting the ab coordinate system into the dq coordinate system. The d-axis current value id output by the second vector rotating unit 108 is input to the d-axis current controller 105. The q-axis current value iq output by the second vector rotating unit 108 is input to the q-axis current controller 106.

Specifically, the second vector rotating unit 108 calculates the d-axis current value id and the q-axis current value iq by rotating a vector current composed of the a-axis current value ia and the b-axis current value ib by the driving angle drv. The d-axis current value id and the q-axis current value iq are represented by the following formulas, respectively.

$$id = ia\ \cos(\theta drv) + ib\ \sin(\theta drv) \quad \text{(Formula 7)}$$

$$iq = -ia\ \sin(\theta drv) + ib\ \cos(\theta drv) \quad \text{(Formula 8)}$$

These formulas 7 and 8 are also represented by the following determinant.

$$\begin{bmatrix} id \\ iq \end{bmatrix} = \begin{bmatrix} \cos(\theta drv) & \sin(\theta drv) \\ -\sin(\theta drv) & \cos(\theta drv) \end{bmatrix} \begin{bmatrix} ia \\ ib \end{bmatrix} \quad \text{(Formula 9)}$$

Figure 9:
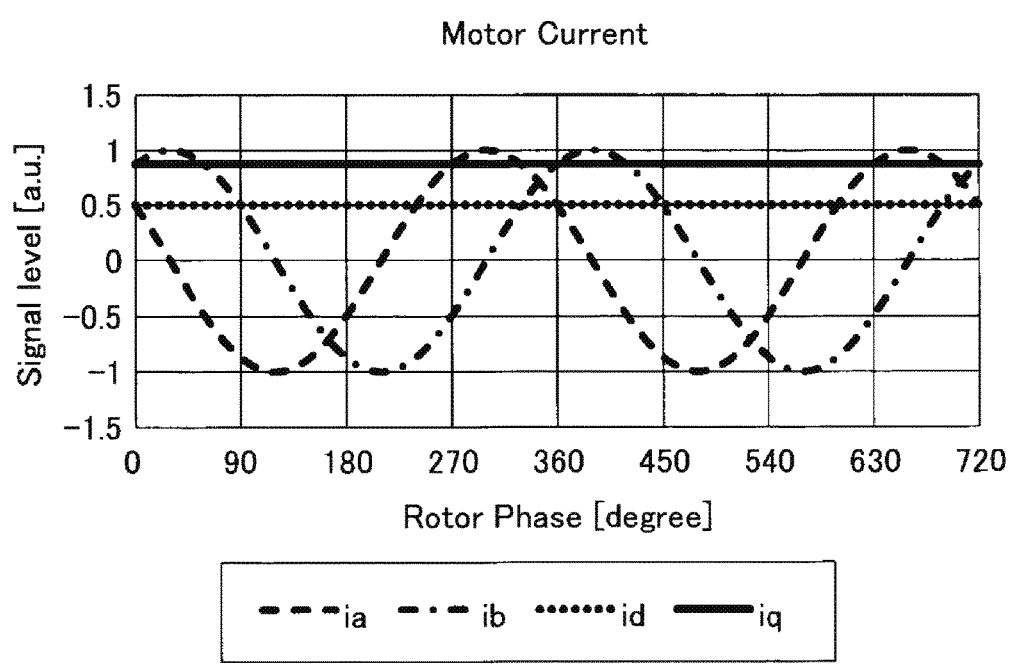
FIG. 9 is a graph illustrating an exemplary operation of a second vector rotating unit according to the first embodiment of the present disclosure.

FIG. 9 is a graph illustrating an exemplary operation of the second vector rotating unit 108. Herein below, an example to which the closed-loop control is executed is described. In FIG. 9, a broken line indicates the a-axis current value ia. A one-point chain line indicates the b-axis current value ib. A dotted line indicates the d-axis current value id. A solid line indicates the q-axis current value iq. A vertical axis indicates a current level of an arbitrary unit [a. u.]. A horizontal axis indicates a true angle θm [degree] of the rotor 11.

In the example of FIG. 9, the phase of each of the a-axis current value ia and the b-axis current value ib is delayed about 30 degrees from the true angle θm. In such a situation, the d-axis current value id is 0.5 (id=0.5), and the q-axis current value iq is 0.866 (iq=0.866). By contrast, when the phase of each of the a-axis current value ia and the b-axis current value ib matches the true angle θm, the d-axis current value id is zero (id=0) and the q-axis current value iq is one (iq=1).

In this way, the d-axis current value id and the q-axis current value iq vary in accordance with the phases of the a-axis current value ia and the b-axis current value ib. Conversely, by controlling and bringing the d-axis current value id and the q-axis current value iq to given levels, the phases of the a-axis current value ia and the b-axis current value ib can be brought to desired levels, respectively.

For example, by conducting current control to render the d-axis current value id to be zero (id=0), each of the phases of the a-axis current value ia and the b-axis current value ib can match the true angle θm. Further, by controlling and bringing the d-axis current value id to a given value other than zero (id≠0) and thereby displacing each of the phases of the a-axis current value ia and the b-axis current value ib by a given value from the true angle θm, a reluctance torque can be upgraded.

With continued reference to FIG. 1, a third selector 109 receives the angle command value θtgt, the angle estimated value θest, and the selecting signal sel. The third selector 109 selects and outputs one of the angle command value θtgt and the angle estimated value θest as a driving angle θdrv in accordance with the selecting signal sel. It is premised herein below that the third selector 109 selects the angle command value θtgt as the driving angle θdrv when the selecting signal sel is zero (sel=0). It is further premised that the third selector 109 selects the angle estimated value θest as the driving angle θdrv when the selecting signal sel is one (sel=1).

An angle estimating unit 110 receives the a-axis voltage command value Va, the b-axis voltage command value Vb, the a-axis current value ia, and the b-axis current value ib. The angle estimating unit 110 estimates an angle and an angular speed of the rotor 11 based on these values. That is, the angle estimating unit 110 calculates and outputs an angle estimated value θest and a speed estimated value ωest.

Figure 10:
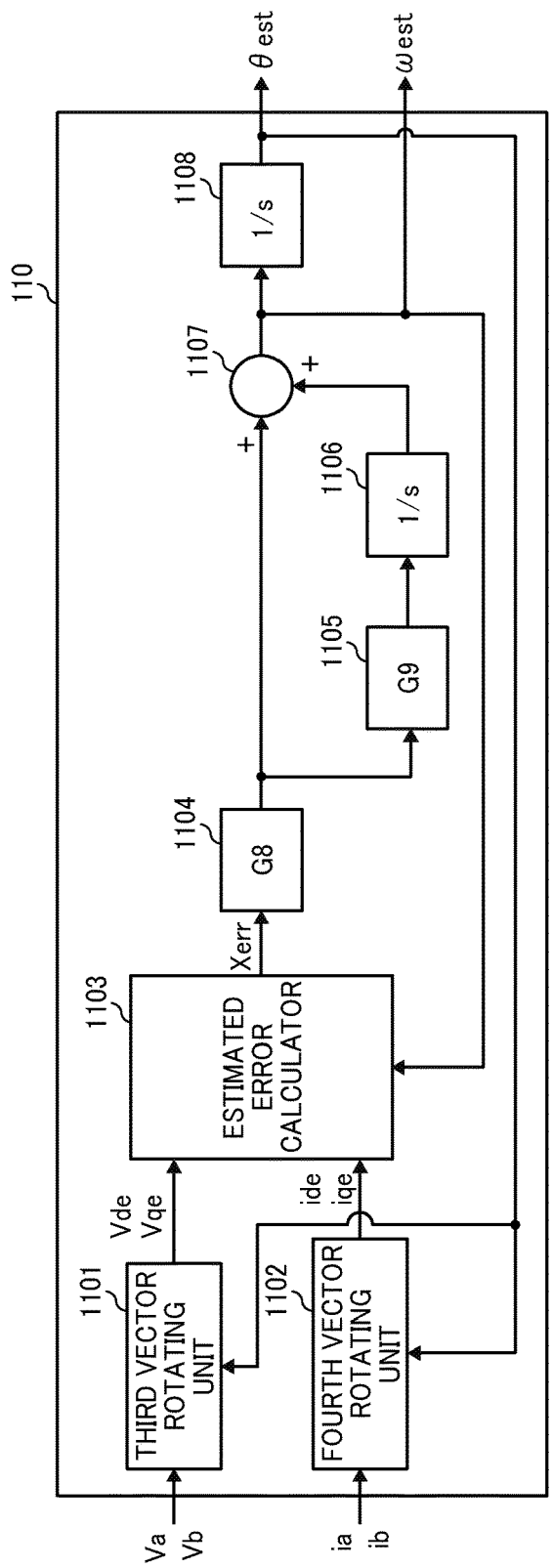
FIG. 10 is a diagram illustrating an exemplary angle estimating unit according to the first embodiment of the present disclosure.

FIG. 10 is a diagram illustrating an example of the angle estimating unit 110. The angle estimating unit 110 of FIG. 10 estimates the true angle θm based on a voltage (e.g., an induced voltage) induced when the rotor 11 revolves. The estimating unit 110 of FIG. 10 includes a third vector rotating unit 1101, a fourth vector rotating unit 1102, an estimated error calculator 1103, multiple amplifiers 1104 and 1105, multiple integrators 1106 and 1108, and an adder 1107.

The third vector rotating unit 1101 receives the a-axis voltage command value Va and the b-axis voltage command value Vb. The third vector rotating unit 1101 calculates and outputs a d-axis voltage command value Vde and a q-axis voltage command value Vqe by rotating a vector voltage composed of the a-axis voltage command value Va and the b-axis voltage command value Vb by an angle estimated value θest. The d-axis voltage command value Vde and the q-axis voltage command value Vqe output by the third vector rotating unit 1101 are input to the estimated error calculator 1103. The d-axis voltage command value Vde and the q-axis voltage command value Vqe are represented by the following formulas, respectively.

$$Vde = Va\ \cos(\theta est) + Va\ \sin(\theta est) \quad \text{(Formula 10)}$$

$$Vqe = -Vb\ \sin(\theta est) + Vb\ \cos(\theta est) \quad \text{(Formula 11)}$$

These formulas 10 and 11 are also represented by the following determinant as well.

$$\begin{bmatrix} Vde \\ Vqe \end{bmatrix} = \begin{bmatrix} \cos(\theta est) & \sin(\theta est) \\ -\sin(\theta est) & \cos(\theta est) \end{bmatrix} \begin{bmatrix} Va \\ Vb \end{bmatrix} \quad \text{(Formula 12)}$$

The fourth vector rotating unit 1102 receives the a-axis current value ia and the b-axis current value ib. The fourth vector rotating unit 1102 calculates and outputs a d-axis current value ide and a q-axis current value iqe by rotating a vector current composed of the a-axis current value ia and the b-axis current value ib by the angle estimated value θest. The d-axis current value ide and the q-axis current value iqe output by the fourth vector rotating unit 1102 are input to the estimated error calculator 1103. These d-axis current value ide and q-axis current value iqe are represented by the following formula, respectively.

$$ide = ia\ \cos(\theta est) + ia\ \sin(\theta est) \quad \text{(Formula 13)}$$

$$iqe = -ib\ \sin(\theta est) + ib\ \cos(\theta est) \quad \text{(Formula 14)}$$

These formulas 10 and 11 are also represented by the following determinant.

$$\begin{bmatrix} ide \\ iqe \end{bmatrix} = \begin{bmatrix} \cos(\theta est) & \sin(\theta est) \\ -\sin(\theta est) & \cos(\theta est) \end{bmatrix} \begin{bmatrix} ia \\ ib \end{bmatrix} \quad \text{(Formula 15)}$$

The estimated error calculator 1103 receives the d-axis voltage command value Vde, the q-axis voltage command value Vqe, the d-axis current value ide, and the q-axis current value iqe. Based on these values, the estimated error calculator 1103 calculates and outputs an estimated error Xerr. The estimated error Xerr is a parameter proportional to an angular error θerr (i.e., θm−θest) as an error (or a difference) between the true angle θm and the angle estimated value θest of the rotor 11. The estimated error Xerr, for example, is calculated by the following formula.

$$Xerr = \frac{1}{-\omega Ke} \times (Vde - Ride + \omega Liqe) \quad \text{(Formula 16)}$$

In the formula (16), Ke represents a reverse voltage constant (i.e., a ratio of a reverse voltage generated in the coil in proportion to the angular speed of the rotor 11), R represents a coil resistance, and L represents a coil inductance. These values Ke, R, and L are determined based on a specification of the motor 1. As the angular speed ω of the rotor 11, an angular speed estimated value ωest is used.

The estimated error Xerr calculated by using the formula (16) draws a sine wave having a phase of the angular error θerr (i.e., Xerr=sin(θerr)). Hence, when the angular error θerr is sufficiently small, the estimated error Xerr is considered to be proportional to the angular error θerr. The estimated error Xerr output by the estimated error calculator 1103 is input to an amplifier 1104.

The amplifier 1104 amplifies the estimated error Xerr with a given gain G8 and outputs an amplified estimated error Xerr obtained in this way. The output value of the amplifier 1104 is input to the other amplifier 1105 and the adder 1107.

The other amplifier 1105 amplifies the output value of the amplifier 1104 with a given gain G9 and outputs an amplified output value obtained in this way. The output value of the amplifier 1105 is input to the integrator 1106.

The integrator 1106 integrates the output value of the amplifier 1105 and outputs an integrated value obtained in this way. The output value (i.e., the integrated value) of the integrator 1106 is input to the adder 1107.

The adder 1107 adds the output value of the amplifier 1104 and the output value of the integrator 1106 and outputs an added value obtained in this way as the speed estimated value ωest. The speed estimate value ωest output by the adder 1107 is input to the angle controller 102, the integrator 1108, and the estimated error calculator 1103. The estimated error calculator 1103 calculates the estimated error Xerr based on the speed estimated value ωest.

The integrator 1108 integrates the speed estimated value ωest and outputs an integrated value obtained in this way as the angle estimated value θest. The angle estimated value θest output by the integrator 1108 is input to the angle controller 102 (see FIG. 1), the third selector 109 (see FIG. 1), a third vector rotating unit 1101, and a fourth vector rotating unit 1102 as illustrated in FIG. 10.

Based on the angle estimated value θest, the third vector rotating unit 1101 calculates a d-axis voltage command value Vde and a q-axis voltage command value Vqe. Similarly, based on the angle estimated value θest, the fourth vector rotating unit 1102 calculates a d-axis current value ide and a q-axis current value iqe.

In this way, the angle estimated value θest is fed back to the third vector rotating unit 1101 and the fourth vector rotating unit 1102. With this, a phase synchronization loop (i.e., a PLL: a Phase Locked Loop), in which the angular error θerr (i.e., the estimated error Xerr) follows zero (0), that is, the angle estimated value θerr follows the true angle θm, is achieved. As a result, the angular estimated value θest can accurately be estimated.

Here, in order to calculate the formula (16), the estimated error calculator 1103 can utilize either only the speed command value ωtgt or both the speed estimated value ωest and the speed command value ωtgt as the angular speed ω of the rotor 11.

Further, it is preferable that the estimated error calculator 1103 uses the speed command value ωtgt when the motor 1 is driven slowly (such as a time when the motor 1 starts up, a time when it stops, etc.) and otherwise uses the speed estimated value ωest in the rest of the times. That is, because an induced voltage is small when the motor 1 is slowly driven, the estimated error Xerr becomes unstable, thereby degrading estimation accuracy of the speed estimation ωest as a result. During such a slow driving time period of the motor 1, the estimation accuracy of the speed estimated value ωest can be upgraded by utilizing the speed command value ωtgt.

Further, in this embodiment of the present disclosure, the angle estimating unit 110 may be operated when the open-loop control is executed. With this, it is possible to reduce power consumption of the motor controller 100 during the open-loop control. At the same time, since the angle estimating unit 110 may be operated when the open-loop control is executed, the speed estimated value ωest of the rotor 11 can be utilized in detecting abnormal operation of the motor 1 and similar events thereof occurring during the open-loop control.

The control method selector 111 receives the speed command value ωtgt. Based on the speed command value ωtgt, the control method selector 111 selects a control method and outputs a selecting signal set indicating a selecting result obtained in this way. As described earlier, the control method selector 111 outputs the value zero (i.e., 0) as the selecting signal sel when it selects the open-loop control. The control method selector 111 outputs the value one (i.e., 1) as the selecting signal sel when it selects the closed-loop control.

Figure 11:
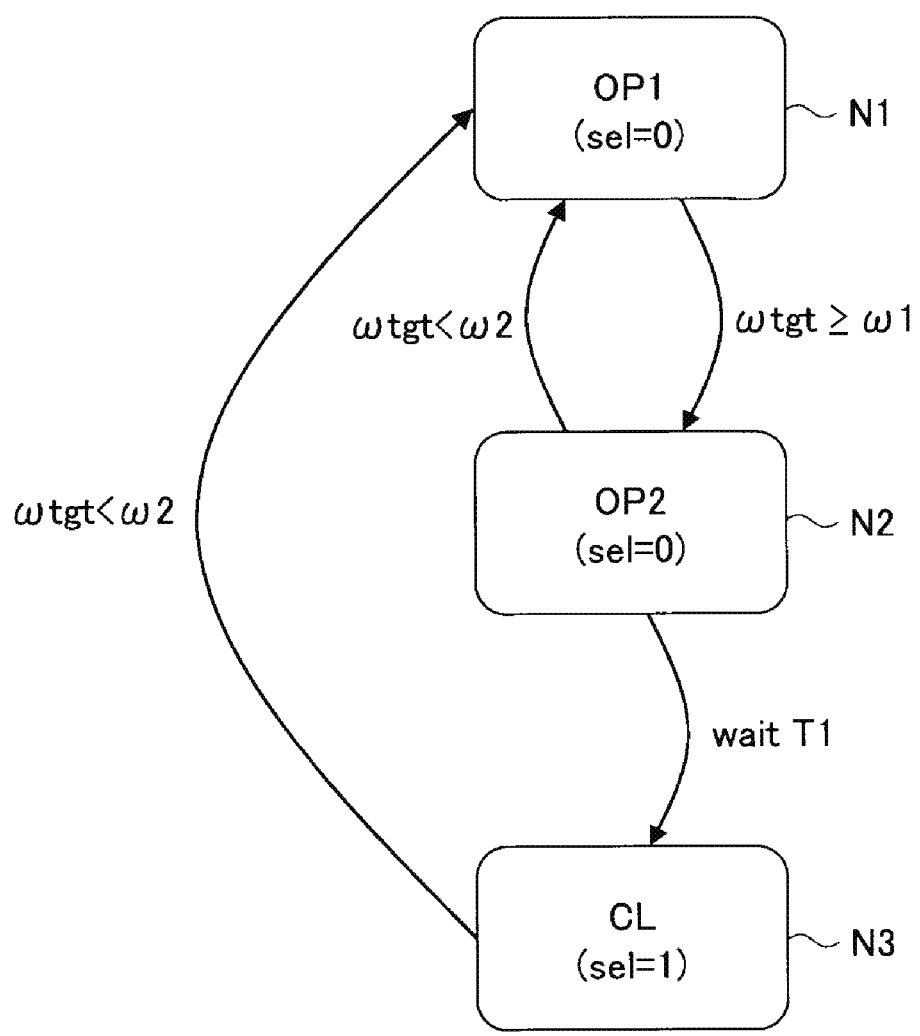
FIG. 11 is a diagram illustrating an exemplary method of selecting a control method and transition of a control method selected state according to a first embodiment of the present disclosure.

FIG. 11 is a diagram illustrating exemplary transition of a control method selected state according to this embodiment of the present disclosure. Each of nodes N1 to N3 illustrated in FIG. 11 indicates a control method selected state of the control method selected by the control method selector 111 to control driving of the motor 1. Hereinafter, these control method selected states of respective nodes N1, N2, and N3 are simply referred to as OP1 (OPEN 1), OP2 (OPEN 2), and CL (CLOSED), respectively.

The selected state OP1 is a state in which the control method selector 111 selects the open-loop control and outputs the value zero (i.e., 0) as the selecting signal sel. During the selected state OP1, when the speed command value ωtgt reaches a given speed threshold ω1 or more, the selected state OP1 transitions to the selected state OP2.

The selected state OP2 is a state in which the control method selector 111 selects the open-loop control and outputs the value zero (0) as the selecting signal sel. During the selected state OP2, when the speed command value ωtgt falls below a given speed threshold ω2, the selected state OP2 transitions back to the selected state OP1. Further, during the selected state OP2, when a period of duration t, which is a time when the selected state OP2 continues, amounts to a given time period T1 or more, the selected state OP2 transitions to the selected state CL.

The selected state CL is a state in which the control method selector 111 selects the closed-loop control and outputs the value one (sel=1) as the selecting signal sel. During the selected state CL, when the speed command value ωtgt falls below the given speed threshold ω2, the selected state CL transitions to the selected state OP1.

Each of the speed thresholds ω1 and ω2 is a given threshold for the speed command value ωtgt. The speed threshold ω1 is determined and set in accordance with experiments and simulations as a lower limit of the speed command value ωtgt, at which the closed-loop control can be stably executed when the motor 1 is accelerated. The speed threshold ω2 is determined and set in accordance with experiments and simulations as a lower limit of the speed command value ωtgt, at which the closed-loop control can be stably executed when the motor 1 is decelerated. The stable closed-loop control means that the closed-loop control is capable of establishing synchronization with less torque vibration.

Figure 12:
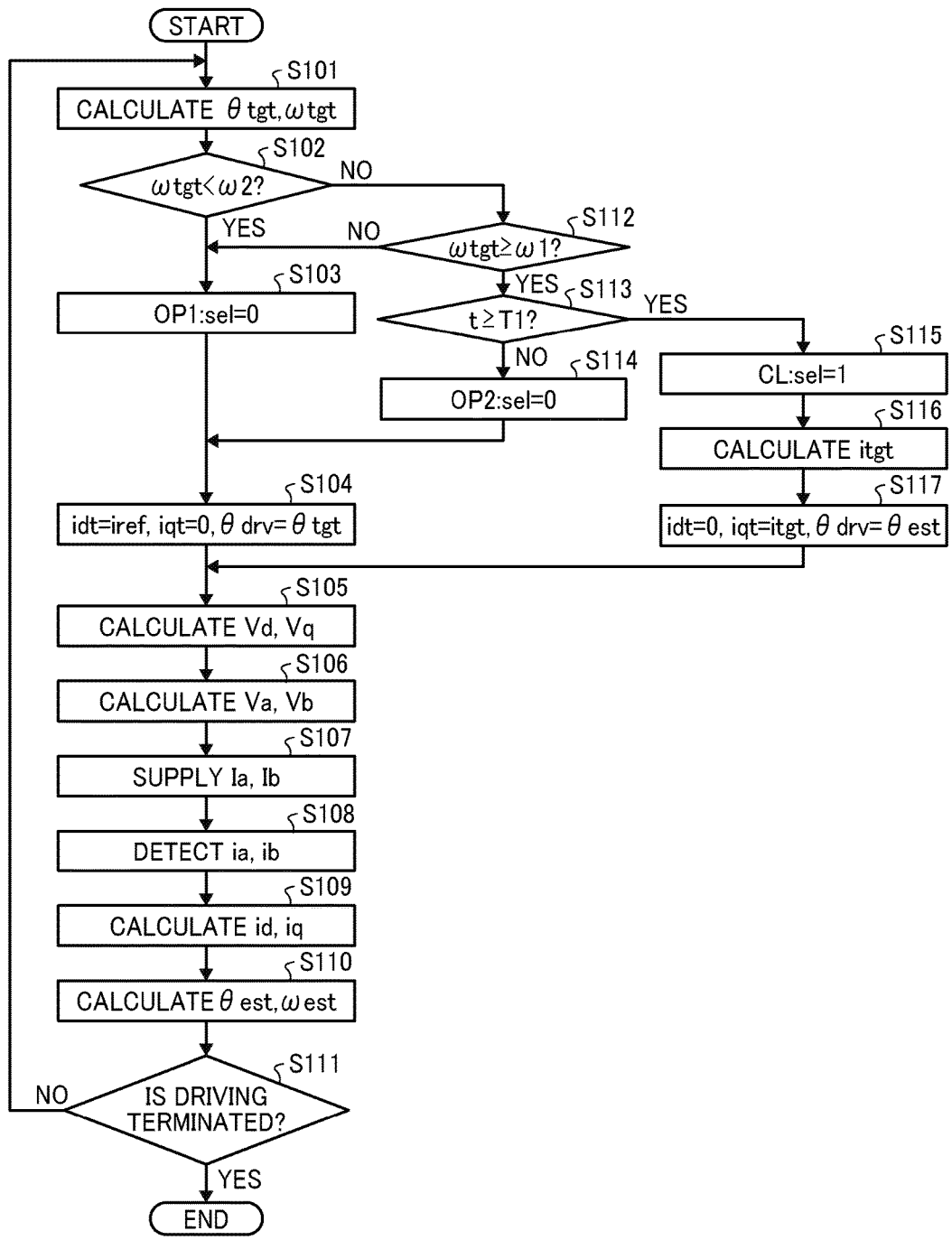
FIG. 12 is a flowchart illustrating an exemplary operational sequence of a motor driving system according to the first embodiment of the present disclosure.

FIG. 12 is a flowchart illustrating an exemplary operational sequence of the motor driving system according to this embodiment of the present disclosure. Specifically, FIG. 12 illustrates operations conducted in a control sequence.

When the control sequence commences, the angle command value calculator 101 firstly measures a frequency of the reference clock refclk and calculates a speed command value ωtgt. The speed command value ωtgt is input to the control method selector 111. The angle command value calculator 101 counts the number of the reference clocks refclk generated from the last control time to a current control timing and calculates an angle command value θtgt (in step S101). The angle command value θtgt is input to the angle controller 102 and the third selector 109.

Then, the control method selector 111 determines if the speed command value ωtgt is below the speed threshold ω2 (in step S102). When the speed command value ωtgt is below the speed threshold ω2 (i.e., YES, in step S102), the control method selector 111 selects the open-loop control as a control method, and outputs a value zero (0) as the selecting signal sel (in step S103). In such a situation, a control method selected state is the selected state OP1. The selecting signal sel is input to the first selector 103, the second selector 104, and the third selector 109.

When the value 0 is input as the selecting signal sel, the first selector 103 outputs a current value iref as the d-axis current command value idt. When the value 0 is input as the selecting signal sel, the second selector 104 also outputs a value zero (0) as the q-axis current command value iqt. In addition, when the value 0 is input as the selecting signal sel, the third selector 109 outputs an angle command value θtgt as a driving angle θdrv (in step S104). The d-axis current command value idt is input to the d-axis current controller 105. The q-axis current command value iqt is also input to the q-axis current controller 106. The driving angle θdrv is input to the first vector rotating unit 107 and the second vector rotating unit 108.

Here, when the open-loop control is selected, the angle controller 102 may be either operated or not operated. For example, the operation of the angle controller 102 can be stopped by inputting the selecting signal sel to the angle controller 102 when the open-loop control is selected.

Subsequently, the d-axis current controller 105 calculates a d-axis voltage command value Vd based on the d-axis current command value idt (=iref) and a d-axis current value id input in the last control time. The q-axis current controller 106 also calculates a q-axis voltage command value Vq based on the q-axis current command value iqt (=0) and a q-axis current value iq input in the last control time (in step S105). The d-axis voltage command value Vd and the q-axis voltage command value Vq are input to the first vector rotating unit 107.

The first vector rotating unit 107 calculates an a-axis voltage command value Va and a b-axis voltage command value Vb by rotating a vector voltage composed of the d-axis voltage command value Vd and the q-axis voltage command value Vq by the driving angle θdrv (=θtgt) (in step S106). The a-axis voltage command value Va and the b-axis voltage command value Vb are input to each of the angle estimating unit 110 and the inverter 2.

Subsequently, the inverter 2 supplies an a-phase driving current Ia in accordance with the a-axis voltage command value Va to the a-phase coil 12A. The inverter 2 also supplies a b-phase driving current Ib in accordance with the b-axis voltage command value Vb to the b-phase coil 12B at the same time (in step S107). Thus, the motor 1 is driven.

While the a-phase driving current Ia and the b-phase driving current Ib are supplied to the motor 1, the current detector 3 detects each of the a-axis current value ia and the b-axis current value ib (in step S108). The a-axis current value ia and the b-axis current value ib detected in this way are input to each of the second vector rotating unit 108 and the angle estimating unit 110.

The second vector rotating unit 108 calculates the d-axis current value id and the q-axis current value iq by rotating a vector current composed of the a-axis current value ia and the b-axis current value ib at the driving angle θdrv (=θtgt) (in step S109). The d-axis current value id and the q-axis current value iq calculated in this way are input to the d-axis current controller 105 and the q-axis current controller 106, respectively.

In addition, the angle estimating unit 110 calculates both an angle estimated value θest and a speed estimated value ωest based on the a-axis voltage command value Va, the b-axis voltage command value Vb, the a-axis current value ia, and the b-axis current value ib (in step S110).

Here, when the open-loop control is selected, the angle estimating unit 110 may be either operated or not operated. For example, when the open-loop control is selected, the operation of the angle estimating unit 110 can be stopped by inputting the selecting signal sel to the angle estimating unit 110.

When the motor 1 stops driving (i.e., YES, in step S111), the process is terminated. By contrast, when the motor 1 is continuously driven (i.e., NO in step S111), the process returns to step S101 again.

When the speed command value ωtgt is the speed threshold ω2 or more (i.e., NO in step S102), the control method selector 111 determines if the speed command value ωtgt is the speed threshold ω1 or more (in step S112). When the speed command value ωtgt is below the speed threshold ω1 (i.e., NO in step S112), the processes of the steps S102 to S111 are conducted as described earlier.

By contrast, when the speed command value ωtgt is the speed threshold ω1 or more (i.e., YES, in step S112), the control method selector 111 determines if the period of duration T, during which the speed command value ωtgt is the speed threshold ω1 or more, reaches a given time period T1 or more (in step S113).

When the period of duration T is below the given time period T1 (i.e., NO in step S113), the control method selector 111 selects the open-loop control as the control method, and outputs the value 0 as the selecting signal sel (in step S114). The selecting signal sel is input to the first selector 103, the second selector 104, and the third selector 109. At this moment, the control method selected state is the selected state OP2. After that, the above-described processes of the steps S104 to S111 are performed.

By contrast, when the period of duration T is the given time period T1 or more (i.e., YES, in step S113), the control method selector 111 selects the closed-loop control as the control method and outputs the value 1 as the selecting signal sel (in step S115). The selecting signal sel is input to the first selector 103, the second selector 104, and the third selector 109. At this moment, the control method selected state is the selected state CL.

When the closed-loop control is selected, the angle controller 102 calculates the current command value itgt based on the angle command value θtgt, and an angle estimated value θest and a speed estimated value ωest input in the last control time (in step S116). The current command value itgt is input to the second selector 104.

Upon receiving the selecting signal sel including the value 1, the first selector 103 outputs a current value 0 as the d-axis current command value idt. At the same time, the second selector 104 outputs a current command value itgt as the q-axis current command value iqt. In addition, upon receiving the selecting signal sel including the value 1, the third selector 109 outputs an angle command value θest as the driving angle θdrv (in step S117). The d-axis current command value idt is input to the d-axis current controller 105. The q-axis current command value iqt is input to the q-axis current controller 106. The driving angle θdrv is input to the first vector rotating unit 107 and the second vector rotating unit 108. After that, the above-described processes of the steps S105 to S111 are sequentially performed. When the closed-loop control is conducted, the angle estimated value θest is utilized as the driving angle θdrv.

To summarize the above-described control method according to this embodiment of the present disclosure, when the set is zero (sel=0), the equalities of idt=iref, iqt=0, and θdrv=θtgt are established. Accordingly, when the sel is the value zero (=0), the a-axis current value ia and the b-axis current value ib are controlled to meet the following formulas, respectively.

$$ia = iref \times cos(\theta tgt) \quad \text{(Formula 17)}$$

$$ib = iref \times sin(\theta tgt) \quad \text{(Formula 18)}$$

As can be seen from the formulas (17) and (18), the phase of each of the a-axis current value ia and the b-axis current value ib is controlled to synchronize with the angle command value θtgt, and the amplitude of each of the a-axis current value ia and the b-axis current value ib is controlled to be a given value iref. That is, the open-loop control, in which the a-axis current value ia and the b-axis current value ib are controlled independent of the angle (i.e., the position) of the rotor 11, is achieved.

By contrast, when the sel is the value one (sel=1), equalities of idt=0, iqt=itgt, and θdrv=θest are established. Hence, when the sel is the value one (sel=1), the a-axis current value ia and the b-axis current value ib are controlled to meet the following formulas 19 and 20.

$$ia = -itgt \times sin(\theta est) \quad \text{(Formula 19)}$$

$$ib = itgt \times cos(\theta est) \quad \text{(Formula 20)}$$

As can be seen from the formulas (19) and (20), the phase of each of the a-axis current value ia and the b-axis current value ib is controlled to synchronize with the angle estimated value θest, and the amplitude of each of the a-axis current value ia and the b-axis current value ib is controlled to be the current command value Itgt in accordance with the speed estimated value ωest. That is, the closed-loop control is realized such that the axis current value ia and the b-axis current value ib are controlled in accordance with the estimated value of the angle (i.e., the position) of the rotor 11.

As described heretofore, according to this embodiment of the present disclosure, one of the open-loop control and the closed-loop control is selectively executed for the motor 1. That is, the open-loop control is executed for the motor 1 during low speed driving thereof (i.e., in selected states OP1 and OP2), and the closed-loop control is executed therefor during high speed driving thereof (i.e., in the selected state CL).

That is, by conducting the open-loop control when the motor 1 is slowly driven, driving of the motor 1 can accurately be controlled. In other words, the rotor 11 can be rotated while following the angle command value θtgt at the time. In addition, the angle (i.e., position) of the rotor 11 can be fixed to a given angle when the motor 1 stops operating.

In addition, by conducting the closed-loop control when the motor 1 is driven at relatively high speed, driving of the motor 1 can accurately be controlled. That is, the rotor 11 can be rotated while following the angle estimated value θest.

With the closed-loop control, the current command value itgt as the amplitude of each of the a-axis current value ia and the b-axis current value ib can vary in accordance with the speed estimated value ωest. With this, the current command value itgt can be adjusted to balance with a load, a speed, a disturbance or the like. That is, when the load or the like is relatively small, the current command value itgt is decreased. By contrast, when the load or the like is relatively great, the current command value itgt can be increased. As a result, power consumption of the motor 1 can be reduced thereby improving power efficiency.

In addition, since the current command value itgt can be negative, a torque can be produced against the rotor 11 in a direction opposite a rotary direction of the rotor 11. Hence, according to this embodiment of the present disclosure, for example, when an electric car equipped with the motor 1 descends a slope and is required to generate a torque in a direction opposite a traveling direction thereof, a desired torque can be generated.

Further, since the motor 1 is controlled based on the reference clock refclk as in a controller included in a conventional stepping motor, the motor controller 100 according to this embodiment of the present disclosure has compatibility with the controller of the conventional stepping motor. As a result, since an upper system does not need to change a design when introducing the motor controller 100, an introduction cost can be reduced while shortening a delivery term.

In addition, according to this embodiment of the present disclosure, the a-phase driving current Ia and the b-phase driving current Ib of the alternating currents are controlled based on the d-axis voltage command value Vd and the q-axis voltage command value Vq (i.e., the d-axis current command value idt and the q-axis current command value iqt) of direct currents each having a low frequency, respectively. Accordingly, when compared with a situation in which the a-axis current value ia and the b-axis current value ib are directly controlled, a control band can be relatively lowered. As a result, a motor driving system can be configured by a relatively inexpensive motor controller 100 operated in a lower control band.

Further, according to this embodiment of the present disclosure, only by switching the inputs to each of the units in accordance with the selecting signal sel, the open-loop control and the closed-loop control can be performed by the same units. Accordingly, the motor controller 100 can be simplified and is inexpensive.

Further, according to this embodiment of the present disclosure, since the phases of the a-axis current value ia and the b-axis current value ib can be controlled based on the d-axis voltage command value Vd and the q-axis voltage command value Vq, the voltage and current of the a-phase driving current Ia and the b-phase driving current Ib can be smoothly connected when the control method is changed. With this, stepping out of the motor 1 sometimes caused when the control method is switched can be suppressed.

Figure 13:
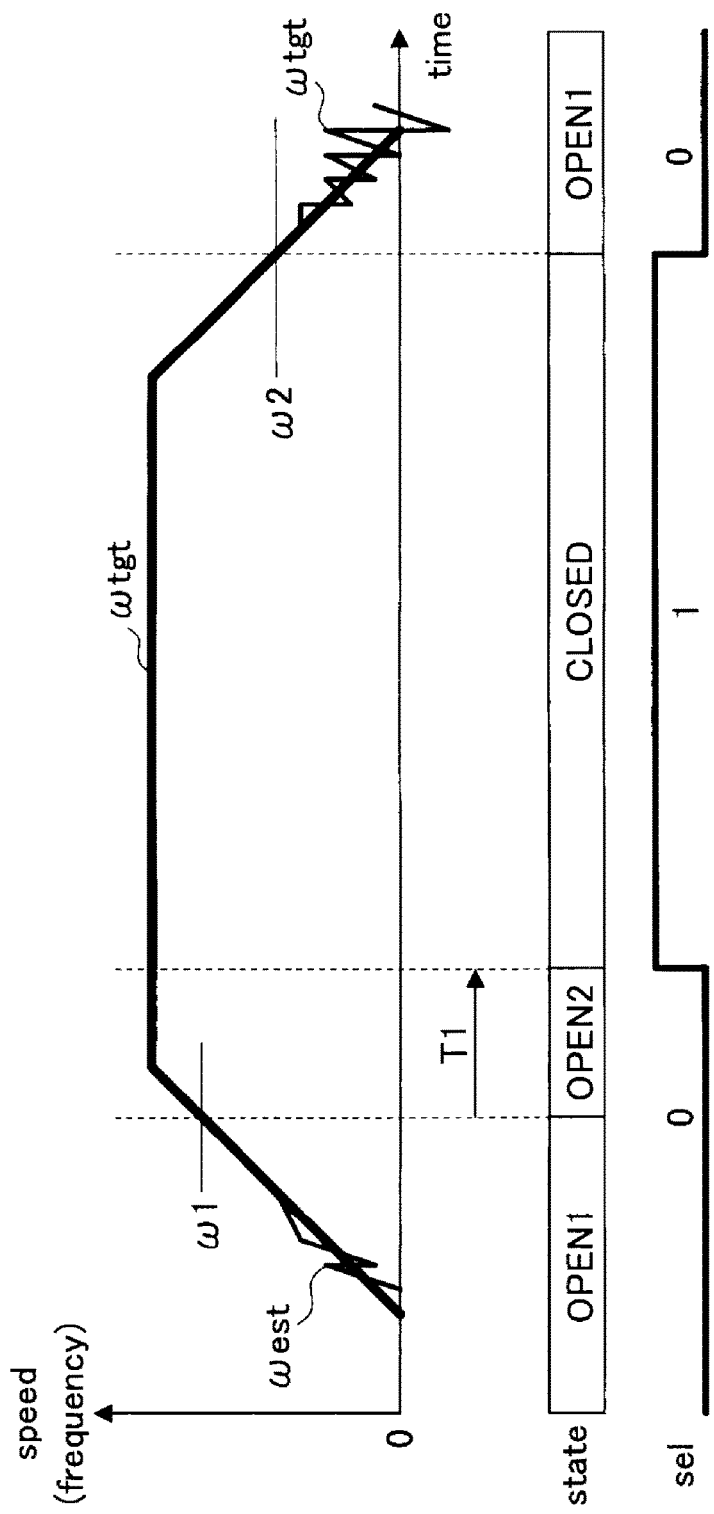
FIG. 13 is a diagram illustrating an exemplary result of a simulation of the motor driving system according to the first embodiment of the present disclosure.

FIG. 13 is a diagram illustrating a simulation result of the motor driving system according to this embodiment of the present disclosure. The graph at the top of FIG. 13 illustrates the speed command value ωtgt and the speed estimated value ωest with a thick line and a thin line, respectively. In the example of FIG. 13, the speed command value ωtgt is constantly accelerated, becomes a steady speed, and is finally constantly decelerated, exhibiting a so-called trapezoidal speed profile.

The middle part of FIG. 13 illustrates the selected states of the control methods selected by the control method selector 111. When the motor 1 starts, the selected state is the OP1 and the speed command value ωtgt is below the speed threshold ω1. The selected state transitions to the selected state OP2 when the speed command value ωtgt becomes the speed threshold ω1 or more. The control method selected state transitions to the selected state CL when a given time period T1 has elapsed after the control method selected state transitions to the selected state OP2. The control method selected state transitions to the selected state OP1 when the speed command value ωtgt falls below the speed threshold ω2.

The graph at the bottom of FIG. 13 illustrates values of the selecting signal sel. The selecting signal sel is zero (sel=0) until a time when a given time period T1 has elapsed after the speed command value ωtgt becomes the speed threshold ω1 or more after the motor 1 starts operating. The selecting signal sel becomes one (sel=1) thereafter when the given time period T1 has elapsed. The selecting signal sel becomes zero (sel=0) when the speed command value ωtgt is below the speed threshold ω2.

That is, after the motor 1 starts operation, the motor 1 is subjected to the open-loop control until the given time period T1 has elapsed after the speed command value ωtgt becomes the speed threshold ω1 or more. The motor 1 is subjected to the closed-loop control.

As can be seen from FIG. 13, the speed estimated value ωest is unstable after the motor 1 starts operation until phase synchronization of angle estimation is established. When the phase synchronization is made, the speed estimated value ωest becomes substantially equivalent to the speed command value ωtgt. In addition, when the motor 1 is decelerated and the speed command value ωtgt is reduced, because the angle estimation becomes difficult, the speed estimated value ωest becomes unstable again.

In the example of FIG. 13, the values of the speed thresholds ω1 and ω2 are previously set so that the open-loop control is selected when the speed estimated value ωest is unstable. By thus presetting the speed thresholds ω1 and ω2, the open-loop control can be executed for the motor 1 when the speed estimated value ωest is unstable (i.e., when the motor 1 cannot be accurately controlled if the closed-loop control is executed therefor). In addition, the period when the speed estimated value ωest follows the speed command value ωtgt (i.e., when the motor 1 can accurately be controlled if the closed-loop control is executed therefor), the closed-loop control can be executed for the motor 1. As a result, the motor 1 can accurately be controlled over the entire driving time period when the motor 1 is driven.

In addition, as in the example of FIG. 13, by setting the speed thresholds ω1 and ω2 to be lower than a steady speed, the closed-loop control can be executed for the motor 1 when the motor 1 operates during the steady (regular) speed. In general, a period of driving the motor 1 at a steady speed is significantly longer than either an acceleration period or a deceleration period of the motor 1. Hence, by setting the speed thresholds ω1 and ω2 in the above-described way and thereby executing the closed-loop control for the motor 1 in most of the driving period, power consumption of the motor 1 can be significantly reduced. As a result, heat generation in the motor 1 can be either reduced or suppressed while downsizing the motor 1 and reducing the cost thereof.

The configuration of the motor driving system according to this embodiment of the present disclosure is not limited to the configuration described with reference to FIG. 1. For example, by omitting the dq coordinate system, the a-axis current value ia and the b-axis current value ib can be directly controlled. In such a configuration, the a-axis current value ia and the b-axis current value ib are controlled to satisfy the formulas 17 to 20.

Now, a motor driving system according to a second embodiment of the present disclosure is described with reference to FIGS. 14 and 15. In this embodiment of the present disclosure, another example of the angle controller 102 is employed as described herein below.

Figure 14:
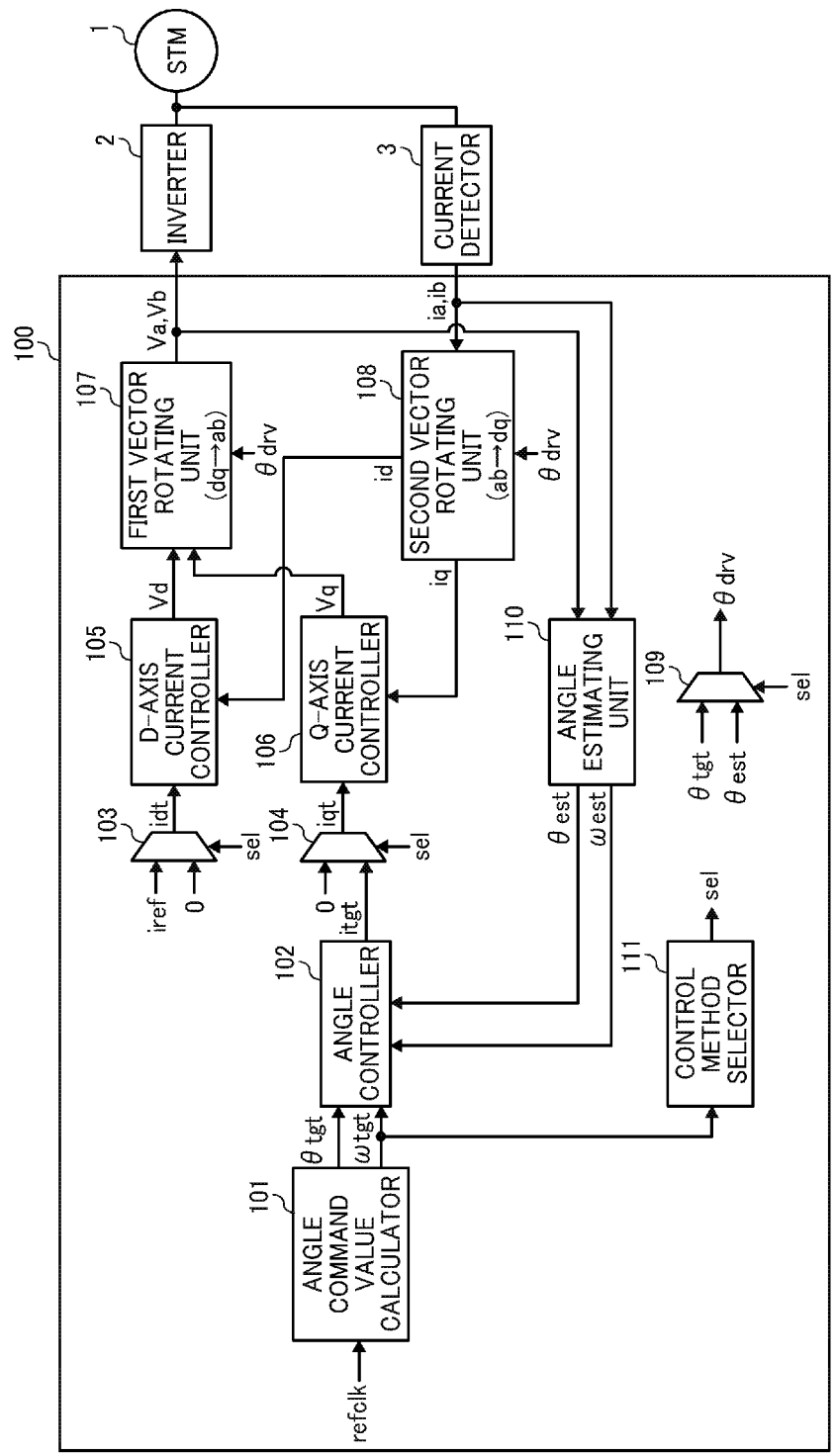
FIG. 14 is a diagram illustrating an exemplary configuration of a motor driving system according to a second embodiment of the present disclosure.

FIG. 14 is a diagram illustrating an exemplary configuration of the motor driving system according to this embodiment of the present disclosure. As illustrated in FIG. 14, a speed command value ωtgt output from the angle command value calculator 101 is input to an angle controller 102 and the control method selector 111. Remaining configurations in this embodiment of the present disclosure are the same as those in the first embodiment (see, e.g., FIG. 1).

Figure 15:
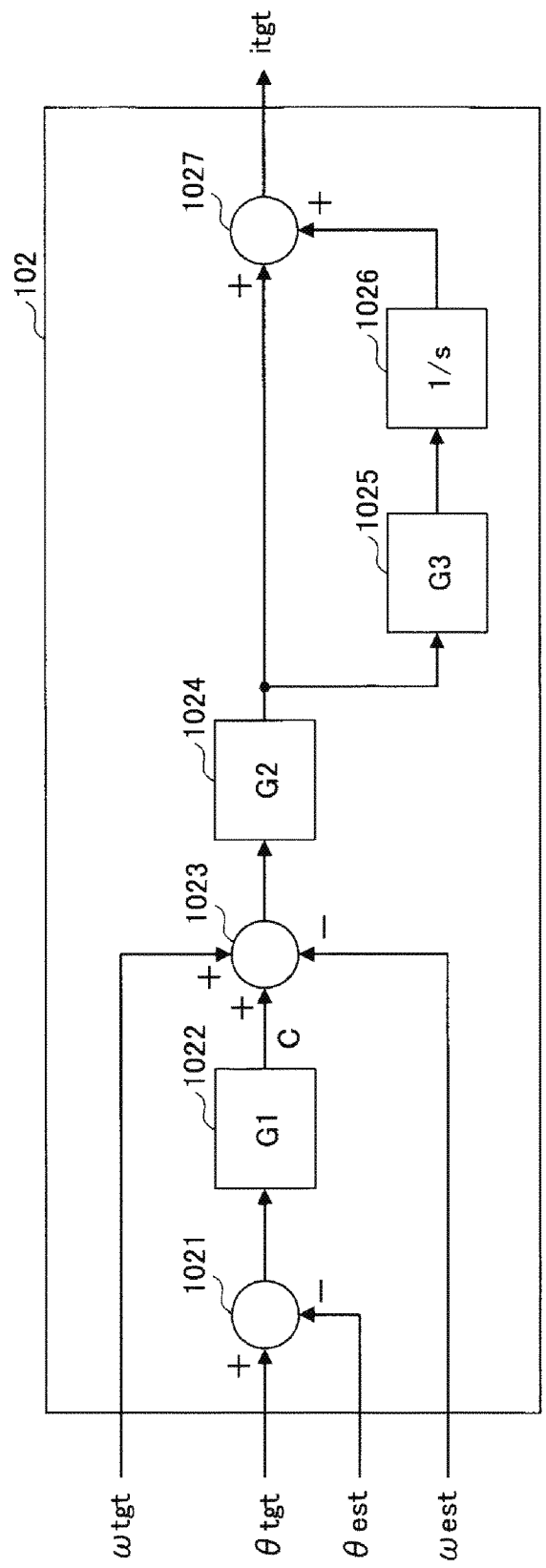
FIG. 15 is a diagram illustrating another exemplary configuration of an angle controller included in the motor driving system of the second embodiment of the present disclosure.

FIG. 15 is a diagram illustrating one example of the angle controller 102 according to this embodiment of the present disclosure. As illustrated in FIG. 15, the speed command value ωtgt is input to the comparator 1023. The comparator 1023 adds an operation amount C to a difference between the speed estimated value ωest and the speed command value ωtgt and outputs an added value (i.e., the sum) obtained in this way. Remaining configurations of the angle controller 102 in the second embodiment of the present disclosure are the same as those in the first embodiment of the present disclosure (see FIG. 4). With such configurations, according to this embodiment of the present disclosure, the current command value itgt is represented by the following formula.

$$itgt = \{C + (\omega tgt - \omega est)\} \times G2 \times (1 + G3 \times 1/s) \quad \text{(Formula 21)}$$

As can be seen from the formulas (1) and (21), the current command value itgt in this embodiment of the present disclosure is the sum of the speed command value ωtgt and a first item of a right side of the formula 1 of the current command value itgt in the first embodiment of the present disclosure. In this embodiment of the present disclosure, the speed command value ωtgt is used as a target value of the speed control.

In the first embodiment of the present disclosure (see FIG. 4), since the speed control is performed by the angle controller 102 while targeting the operation amount C, the operation amount C is proportional to the speed command value ωtgt. That is, a difference between the angle command value θtgt and the angle estimated value θest is proportional to the speed command value ωtgt. As a result, the faster the motor 1 driven, the greater the difference between the angle command value θtgt and the angle estimated value θest.

By contrast, according to this embodiment of the present disclosure (i.e., FIG. 15), since the speed control is performed by the angle controller 102 while targeting the speed command value ωtgt, the operation amount C is independent of the speed command value ωtgt. As a result, the operation amount C is not proportional to the speed command value ωtgt, and is close to zero. Hence, the angle controller 102 in this embodiment of the present disclosure can upgrade the followability to the angle command value θtgt.

In addition, in the angle controller 102 of the first embodiment of the present disclosure, a response (i.e., a speed control response) to a change in the speed command value ωtgt is made after a response (i.e., an angle control response) to a change in the angle command value θtgt.

By contrast, in the angle controller 102 of this embodiment of the present disclosure, when the speed command value ωtgt changes, a speed control response is instantaneously started. Hence, according to the angle controller 102 of this embodiment of the present disclosure, a response to the change in the speed command value ωtgt is hastened while upgrading the followability to the speed command value ωtgt.

Now, a motor driving system according to a third embodiment of the present disclosure is described with reference to FIGS. 16 to 18. In this embodiment of the present disclosure, another exemplary method of selecting a control method with the control method selector 111 is employed as herein below described.

Figure 16:
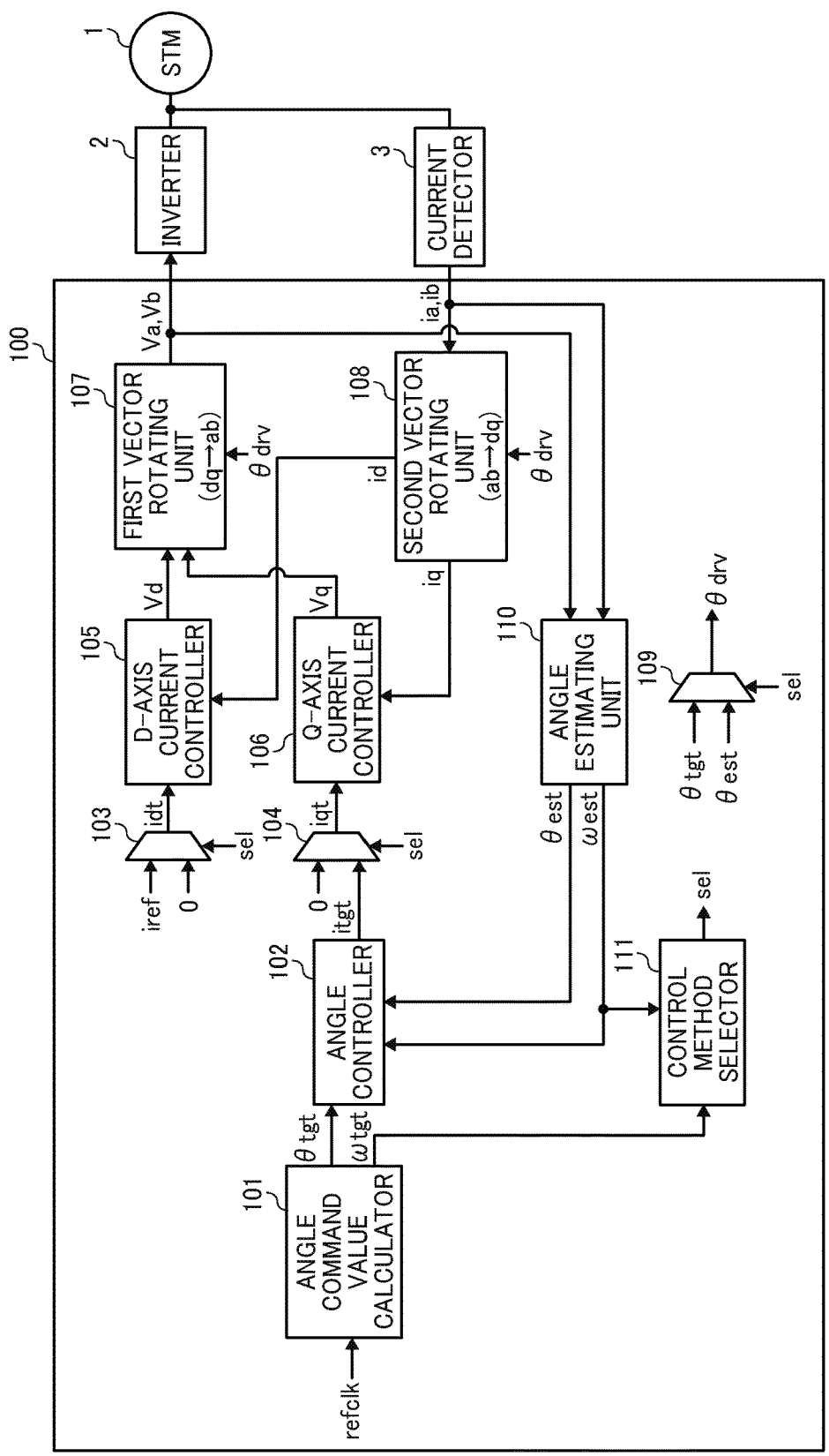
FIG. 16 is a diagram illustrating yet another exemplary configuration of a motor driving system according to a third embodiment of the present disclosure.

FIG. 16 is a diagram illustrating an exemplary configuration of the motor driving system according to a third embodiment of the present disclosure. As illustrated in FIG. 16, in this embodiment of the present disclosure, the speed estimated value ωest output from the angle estimating unit 110 is input to the angle controller 102 and the control method selector 111. Remaining configurations of this embodiment of the present disclosure are the same as those described in the first embodiment of the present disclosure with reference to FIG. 1.

Figure 17:
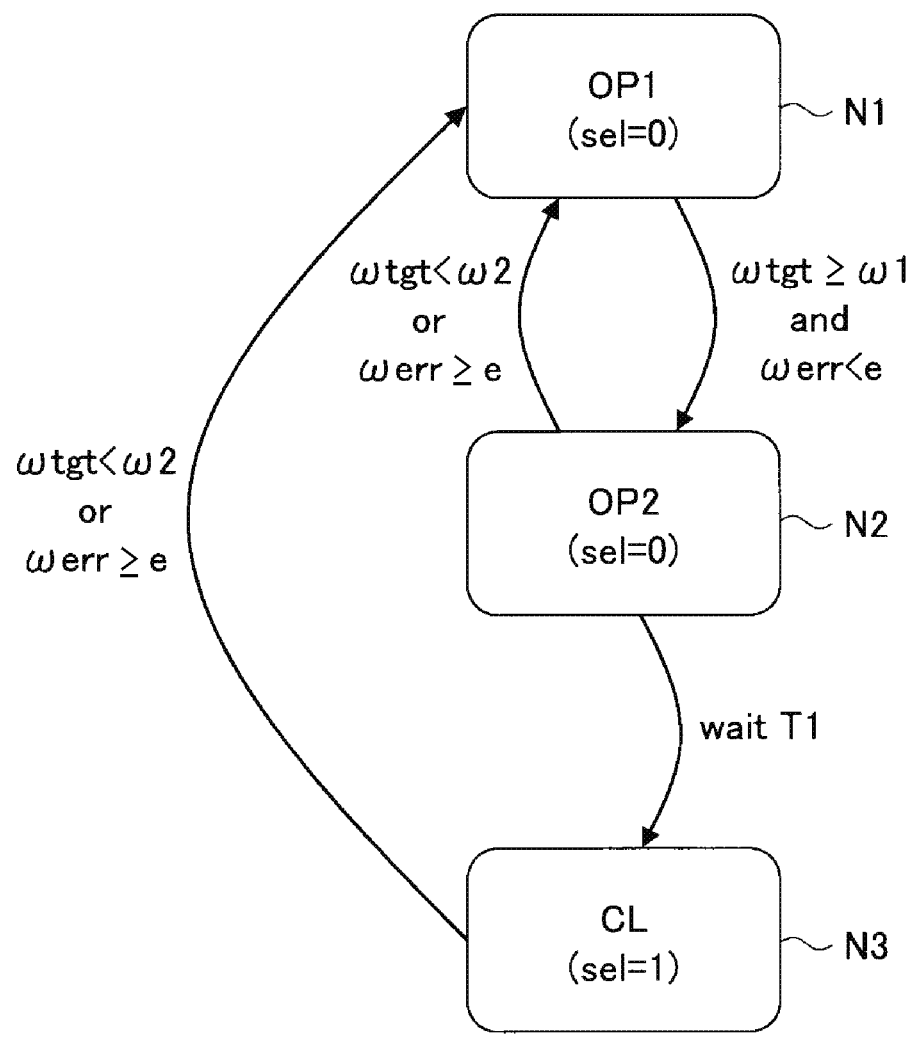
FIG. 17 is a diagram illustrating an exemplary method of selecting a control method and transition of a control method selected state according to the third embodiment of the present disclosure.

FIG. 17 is a diagram illustrating a method of selecting a control method and state transition of the control method according to this embodiment of the present disclosure. As illustrated in FIG. 17, in this embodiment of the present disclosure, a method of selecting a control method is determined as described below (i.e., a selected state transitions based on various conditions).

That is, in the selected state OP1, when the speed command value ωtgt becomes a given speed threshold ω1 or more, and a difference between the speed command value ωtgt and the speed estimated value ωest (hereinafter simply referred to as a speed error ωerr) is below an error threshold e, the selected state OP1 transitions to the selected state OP2.

During the selected state OP2, when either the speed command value ωtgt falls below the given speed threshold ω2 or the speed error ωerr becomes the error threshold e or more, the selected state OP2 transitions to the selected state OP1. In addition, during the selected state OP2, when the period of duration t of the selected state OP2 becomes more than a given period T1, the selected state OP2 transitions to the selected state CL.

During the selected state CL, when either the speed command value ωtgt is below the given speed threshold ω2 or the speed error ωerr becomes the error threshold e or more, the selected state CL transitions to the selected state OP1.

Here, the error threshold e is a given threshold of the speed error ωerr previously determined and set. The error threshold e is determined and set based on experiments and simulations as an upper limit of the speed error ωerr up to which the closed-loop control can be stably conducted.

Figure 18:
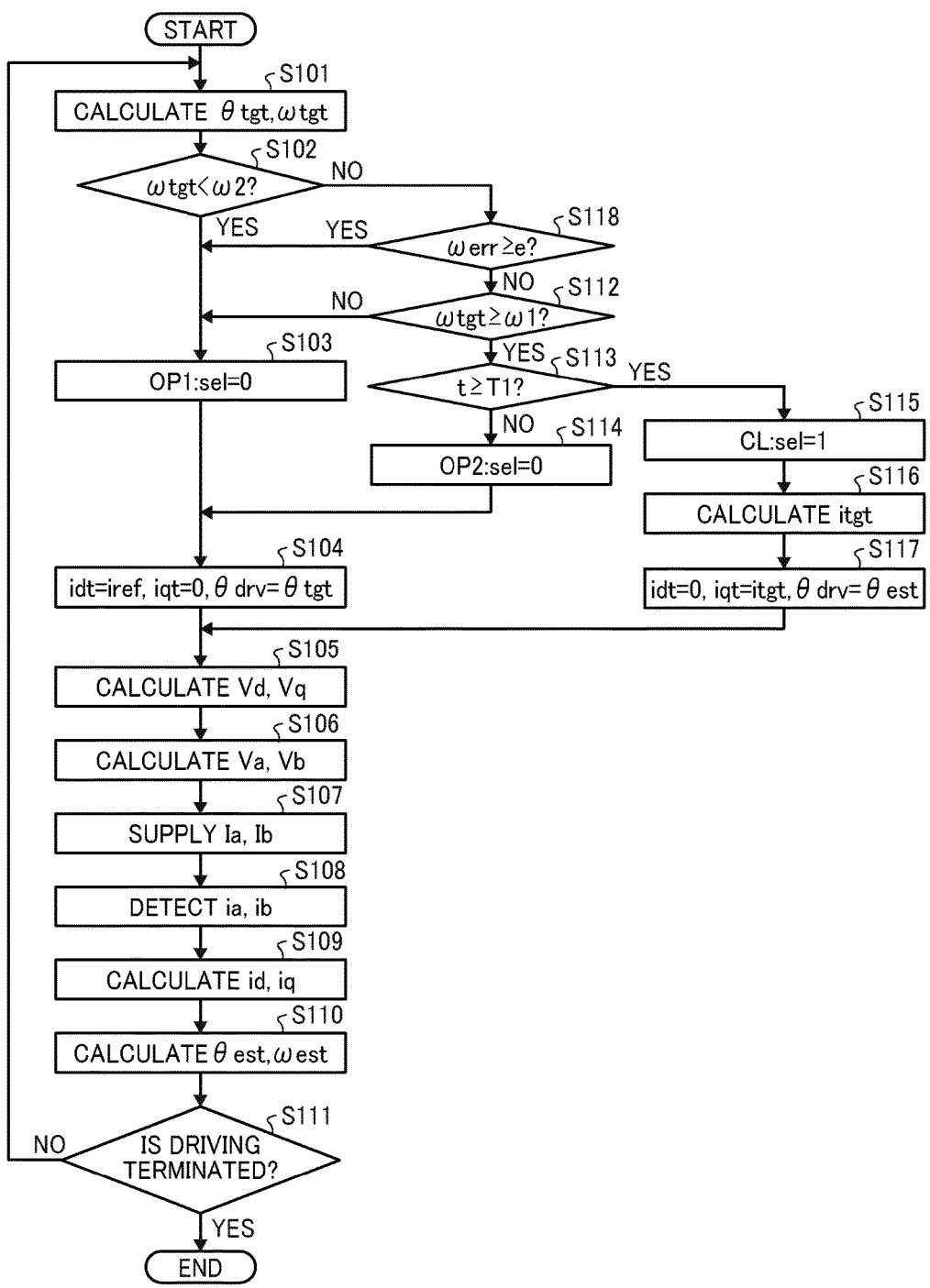
FIG. 18 is a flowchart illustrating an exemplary sequence of operations of the motor driving system of the third embodiment of the present disclosure.

FIG. 18 is a flowchart illustrating an exemplary sequence of operation of the motor driving system according to the third embodiment of the present disclosure.

The flowchart of FIG. 18 of this embodiment of the present disclosure additionally includes a step S118. That is, remaining steps S101 to S117 of FIG. 18 in this embodiment of the present disclosure are the same as those in the first embodiment of the present disclosure as described with reference to FIG. 12.

As also illustrated in FIG. 18, in this embodiment of the present disclosure, when the speed command value ωtgt is the speed threshold ω2 or more (i.e., NO in step S102), the control method selector 111 determines if the speed error ωerr is the error threshold e or more (in step S118).

When the speed error ωerr is the error threshold e or more (i.e., YES, in step S118), the control method selector 111 selects the open-loop control as the control method and outputs the value zero (sel=0) as the selecting signal sel (in step S103). Subsequent processes to the step S103 are the same as those described earlier with reference to FIG. 12.

By contrast, when the speed error ωerr is below the error threshold e (i.e., NO in step S118), the process proceeds to a step S112. Processes subsequent to the step S112 are similarly conducted as described earlier with reference to FIG. 12.

As described heretofore, according to this embodiment of the present disclosure, when the speed error ωerr is relatively small thereby enabling stable closed-loop control, the closed-loop control is selected. Hence, the motor 1 can be more stably controlled by the closed-loop control.

Now, the motor driving system according to a fourth embodiment of the present disclosure is described with reference to FIGS. 19 to 24. In this embodiment of the present disclosure, field weakening control is employed as described below.

Figure 19:
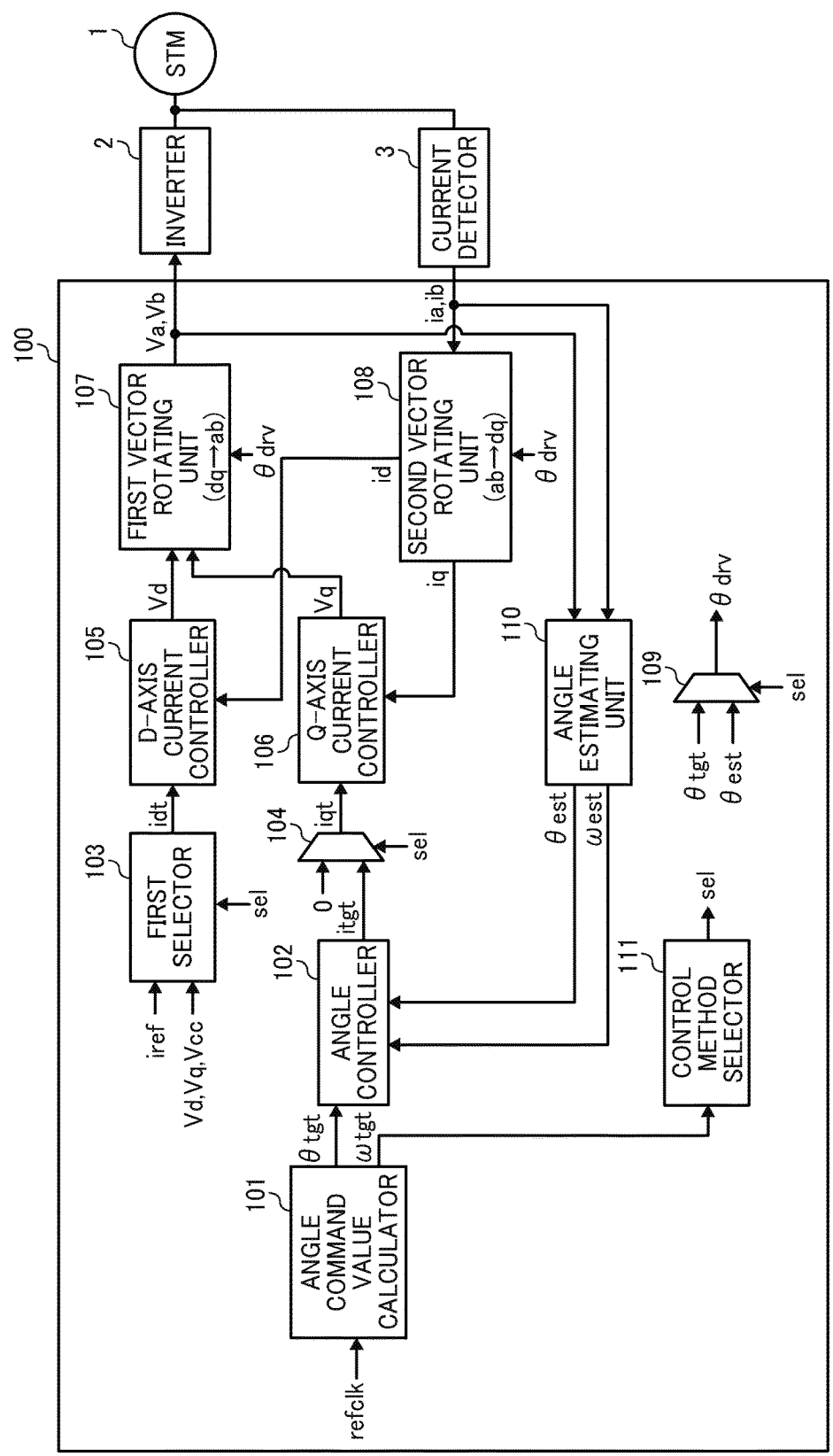
FIG. 19 is a diagram illustrating yet another exemplary configuration of a motor driving system according to a fourth embodiment of the present disclosure.

FIG. 19 is a diagram illustrating an exemplary configuration of a motor driving system according to a fourth embodiment of the present disclosure. A configuration of the motor driving system of this embodiment of the present disclosure is the same as that of the first embodiment of the present disclosure except for the first selector 103 as described below.

As illustrated in FIG. 19, the first selector 103 receives a d-axis voltage command value Vd, a q-axis voltage command value Vq, and a power supply voltage Vcc instead of the current value 0 of the first embodiment of the present disclosure. In this embodiment, the first selector 103 selects a current value iref as the d-axis current command value idt when the selecting signal sel is zero (sel=0) (i.e., when the open-loop control is selected as the control method). Hence, the motor driving system operated when the selecting signal sel is zero (sel=0) is the same as that operated in the first embodiment of the present disclosure.

By contrast, when the selecting signal sel is one (sel=1) (i.e., when the control method is the closed-loop control), the first selector 103 outputs a value that is given times of the q-axis current command value iqt as the d-axis current command value idt based on the d-axis voltage command value Vd, the q-axis voltage command value Vq, and the power supply voltage Vcc. The d-axis current command value idt of this embodiment of the present disclosure is described later more in detail.

Herein below, exemplary operation of the first selector 103 conducted when the closed-loop control is selected and executed is described.

As described above, the d-axis current value id follows the d-axis current command value idt, and the q-axis current value iq follows the q-axis current command value iqt. Hence, to control the d-axis current command value idt and the q-axis current command value iqt is equivalent to control the d-axis current value id and the q-axis current value iq.

While the motor 1 is driven, between the terminals of the A-phase coil 12A and those of the B-phase coil 12B, reverse voltages are generated in proportion to a speed and a strength of magnetic flux of the rotor 11, respectively. Hence, to establish the closed-loop control, the d-axis voltage command value Vd and the q-axis voltage command value Vq are required to satisfy the following formulas, respectively.

$$Vd = R \times id - w \times L \times iq \quad \text{(Formula 22)}$$

$$Vq = R \times iq + w(L \times id + Ke) \quad \text{(Formula 23)}$$

In the formulas (22) and (23), characters R and L are a resistance value (ohm) and an inductance (H), respectively, of each of the A-phase coil 12A and the B-phase coil 12B. A character w is the number of rotations (rad/sec) of the rotor 11. A character Ke is a constant of reverse voltage (V/rad/sec) generated in proportion to the number of rotations w.

As can be seen from the formula (22), when the closed-loop control is executed and the d-axis current command value idt (or the d-axis current value id) is 0 as in the first embodiment of the present disclosure, the d-axis voltage command value Vd becomes a negative value. In addition, it can also be seen from the formula (23) that the larger the rotational speed w, the larger the q-axis voltage command value Vq.

Figure 20:
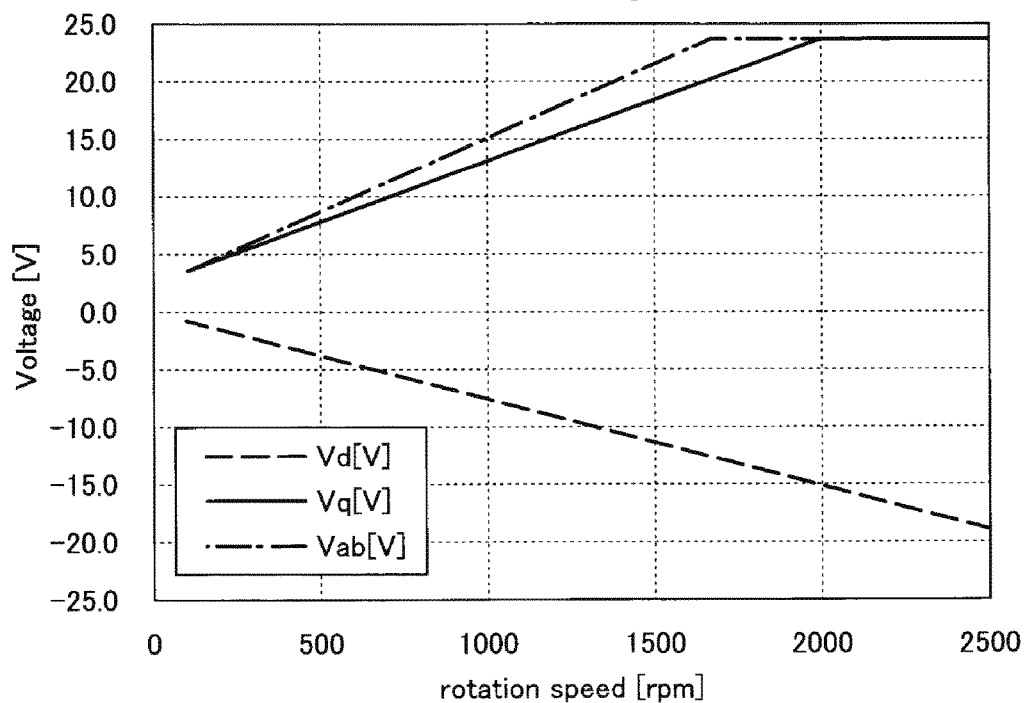
FIG. 20 is a graph illustrating an exemplary relation between a voltage command value and a rotational speed established in a closed-loop control mode according to one embodiment of the present disclosure.

FIG. 20 is a graph illustrating an exemplary relation between a voltage command value and a rotational speed when the closed-loop control is executed.

In the example of FIG. 20, it is assumed that the d-axis current command value idt is 0. In addition, the resistance value R is 9.1 (ohm), the inductance H is 20 mH, the reverse-voltage constant Ke is 0.008 (V/rad/sec), the d-axis current value id is zero (0 A), the q-axis current value iq is 0.3 (A), and the power supply voltage Vcc is 24 (V). In the drawing, a broken line indicates the d-axis voltage command value Vd, a solid line indicates the q-axis voltage command value Vq, and a one-point chain line indicates a phase voltage Vab $(=(Vd^2+Vq^2)^{1/2})$.

As illustrated in FIG. 20, each of the d-axis voltage command value Vd, the q-axis voltage command value Vq, and the phase voltage Vab is saturated when the amplitude thereof becomes about 24V (i.e., the power supply voltage Vcc). In the example of FIG. 20, the d-axis voltage command value Vd is saturated at about 2000 rpm, and the phase voltage Vab is saturated at about 1700 rpm. In general, since the closed-loop control can be established until either the d-axis voltage command value Vd or the q-axis voltage command value Vq is saturated, the closed-loop control can be applied up to about 2000 rpm in the example of FIG. 20. In other words, in the example of FIG. 20, it is possible to practically execute the closed-loop control only up to about 2000 rpm.

Figure 21:
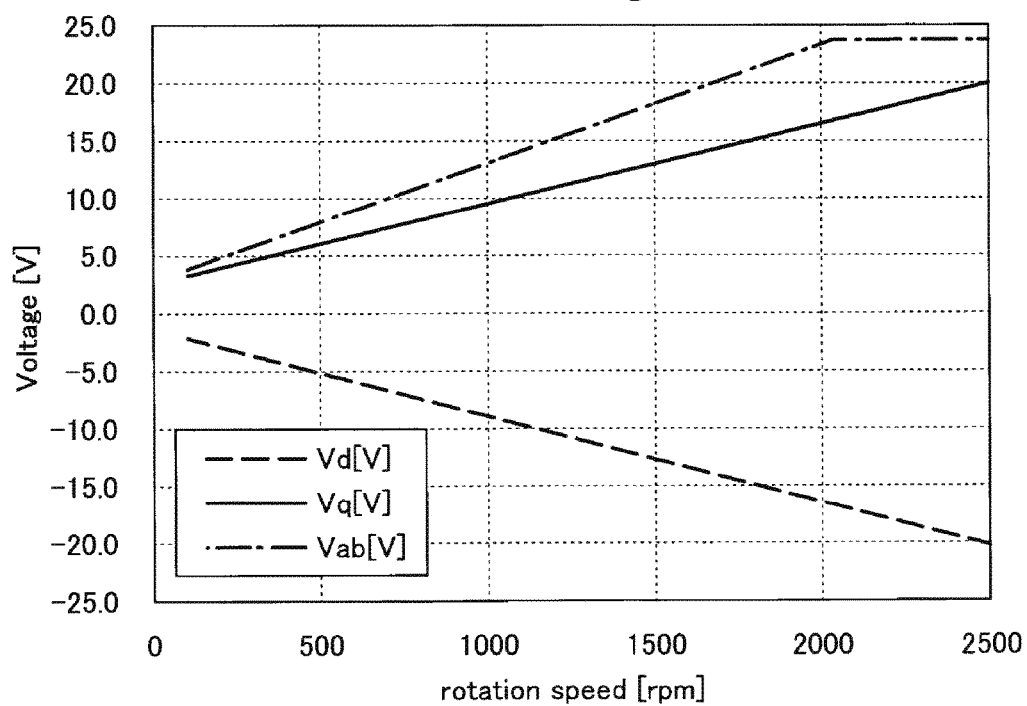
FIG. 21 also is a graph illustrating another exemplary relation between the voltage command value and the rotational speed established in the closed-loop control mode according to one embodiment of the present disclosure.

FIG. 21 is a graph illustrating another exemplary relation between the voltage command value and the rotational speed when the closed-loop control is executed.

In the example of FIG. 21, it is assumed that the d-axis current command value idt is −0.14 (A). As illustrated there, since the d-axis voltage command value Vd is not saturated even at 2500 rpm, it can be seen that the closed-loop control can be applied up to the rotational speed of 2500 rpm or more.

Control of rendering the value of the d-axis current value id other than zero (0 A) and thereby lowering the voltage command value required to establish the closed-loop control in this way is herein below referred to as field weakening control.

By using the field weakening control and thereby lowering the voltage command value, the upper limit of the rotational speed that can normally realize the closed-loop control can be raised. The first selector 103 of this embodiment of the present disclosure realizes the field weakening control by outputting a ratio A between the d-axis current command value idt and the q-axis current command value iqt as the d-axis current command value idt.

Figure 22:
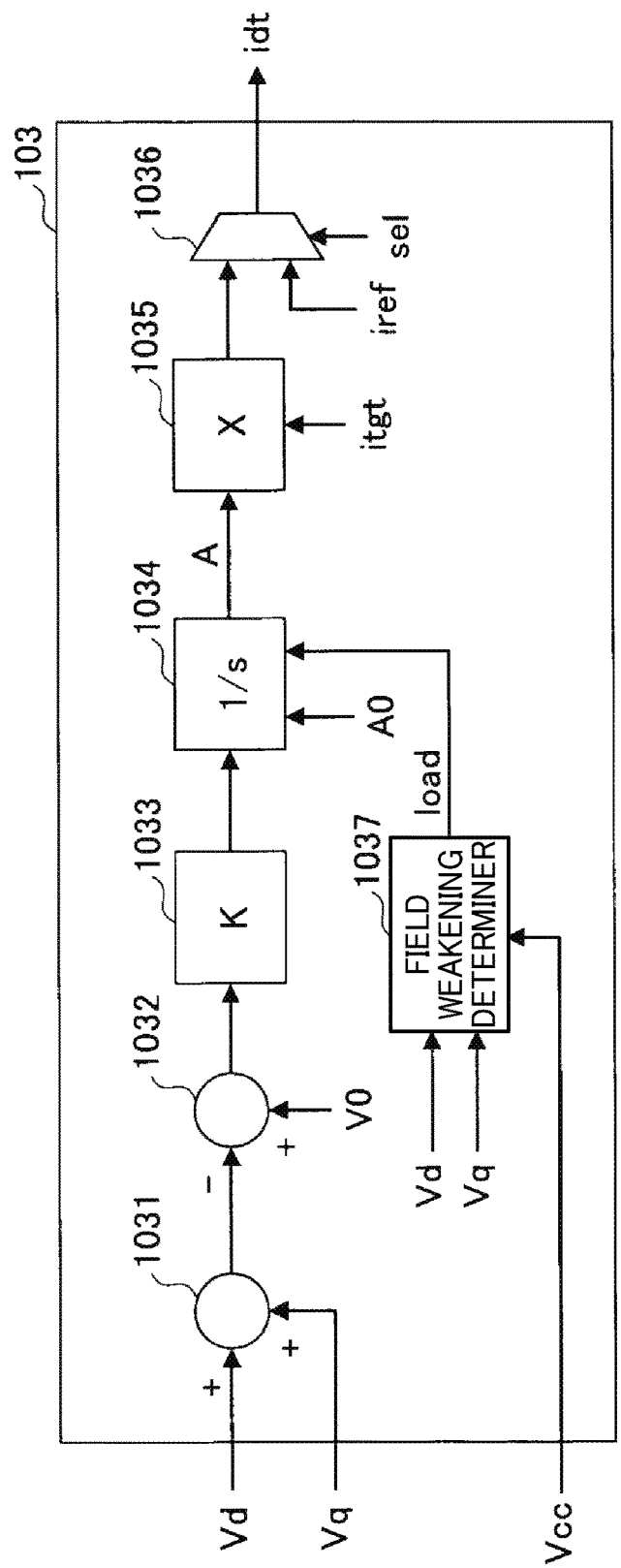
FIG. 22 is a diagram illustrating an exemplary first selector included in the fourth embodiment of the present disclosure.

FIG. 22 is a diagram illustrating one example of the first selector 103 according to the fourth embodiment of the present disclosure.

The first selector 103 of FIG. 22 includes an adder 1031, a subtracter 1032, an amplifier 1033, an integrator 1034, a multiplier 1035, a selector 1036, and a field weakening determiner 1037.

The adder 1031 receives the d-axis voltage command value Vd and the q-axis voltage command value Vq. The adder 1031 adds the d-axis voltage command value Vd and the q-axis voltage command value Vq and outputs an added value obtained in this way. The output value of the adder 1031 is input to the subtracter 1032.

The subtracter 1032 receives the output value of the adder 1031 and a given value V0 a second given value). The given value V0 is a constant value previously determined and set. The subtracter 1032 subtracts the output value of the adder 1031 from the given value V0 and outputs a subtracted value obtained in this way. The output value of the subtracter 1032 is input to the amplifier 1033.

The amplifier 1033 receives the output value of the subtracter 1032. The amplifier 1033 amplifies the output value of the subtracter 1032 with a given gain K and outputs an amplified value obtained in this way. The gain K is a constant that determines a convergence speed of an integration described later in detail. By appropriately determining and setting the gain K, it is possible to avoid an abrupt change in the current command value idt while suppressing changes in torque and the number of rotations. The output value of the amplifier 1033 is input to the integrator 1034.

The integrator 1034 receives the output value of the amplifier 1033, the given value A0 (i.e., the first given value), and a switching signal load. The given value A0 is a constant value previously determined and set. The switching signal load is a binary signal used to switch from activation to deactivation of the field weakening control and vice versa, and is input from the field weakening determiner 1037 to the integrator 1034.

Herein below, it is premised that the field weakening determiner 1037 outputs a value 0 as the switching signal load when it activates the field weakening control. The field weakening determiner 1037 outputs a value 1 as the switching signal load when it deactivates the field weakening control.

The integrator 1034 outputs the given value A0 as the output value A when it receives the value 1 as the switching signal load (i.e., the field weakening control is deactivated). The given value A0, for example, is the value 0. In such a situation, since the current value 0 is output as the d-axis current command value idt, the closed-loop control is similarly performed to that performed in the first embodiment.

By contrast, upon receiving the value 0 as the switching signal load (i.e., the field weakening control is activated), the integrator 1034 outputs a value obtained by integrating the output value of the amplifier 1033 based on the given value A0 as the output value A. The output value A of the integrator 1034 is input to the multiplier 1035.

The multiplier 1035 receives the output value A of the integrator 1034 and the current command value itgt. The multiplier 1035 multiplies the output value A by the current command value itgt and outputs a multiplied value obtained in this way. The output value of the multiplier 1035 is input to the selector 1036.

The selector 1036 receives the output value of the multiplier 1035, the current value iref, and the selecting signal sel. Upon receiving the value 0 as the selecting signal sel, the selector 1036 outputs the current value iref as the d-axis current command value idt. By contrast, upon receiving the value 1 as the selecting signal sel, the selector 1036 outputs the output value of the multiplier 1035 as the d-axis current command value idt.

The field weakening determiner 1037 receives the d-axis voltage command value Vd, the q-axis voltage command value Vq, and the power supply voltage value Vcc. The field weakening determiner 1037 determines whether to activate the field weakening control or not and outputs the switching signal load in accordance with a result of the determination made based on the d-axis voltage command value Vd, the q-axis voltage command value Vq, and the power supply voltage value Vcc. As described above, the field weakening determiner 1037 outputs the value 0 as the switching signal load when activating the field weakening control, and outputs the value 1 as the switching signal load when deactivating the field weakening control.

Figure 23:
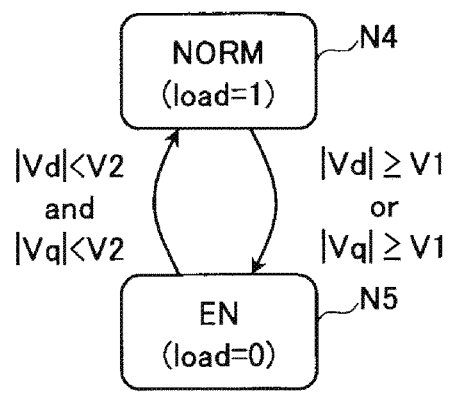
FIG. 23 is a diagram illustrating an exemplary method of switching to a field weakening control mode and another control mode and transition of a control method selected state in the fourth embodiment of the present disclosure.

FIG. 23 is a diagram illustrating an exemplary method of switching field weakening control and transition states according to the fourth embodiment of the present disclosure. Each of nodes illustrated in FIG. 23 indicates a state of the field weakening control determined by the field weakening determiner 1037. Hereinafter, determined states of the nodes N4 and N5 are referred to as states NORM and EN, respectively.

The state NORM is a state in which the field weakening determiner 1037 determines to deactivate field weakening control and outputs the value 1 as the switching signal load. In the state NORM, when either the magnitude (absolute value) of the d-axis voltage command value Vd becomes a first threshold V1 or more or the magnitude (absolute value) of the q-axis voltage command value Vq becomes a first threshold V1 or more, the state NORM transitions to the state EN.

The state EN is a state in which the field weakening determiner 1037 determines to activate the field weakening control and outputs the value 0 as the switching signal load. In the state EN, when the magnitude (absolute value) of the d-axis voltage command value Vd falls below the second threshold V2 and the magnitude (absolute value) of the q-axis voltage command value Vq is below the second threshold V2, the state EN transitions to the state NORM.

The first threshold V1 is set to a vicinity of the power supply voltage value Vcc. For example, the first threshold V1 is set to about 0.95 Vcc, but is not limited thereto. Hence, with the first threshold V1 set to the vicinity of the power supply voltage value Vcc in this way, when the d-axis voltage command value Vd comes close to the power supply voltage value Vcc, the state NORM transitions to the state EN, thereby activating the field weakening control. Accordingly, the saturation of the d-axis voltage command value Vd can be delayed. Similarly, when the q-axis voltage command value Vq comes close to the power supply voltage value Vcc, the state NORM transitions to the state EN, thereby activating the field weakening control. Accordingly, the saturation of the q-axis voltage command value Vq can be delayed.

The second threshold V2 is set smaller than the first threshold V1. For example, the second threshold V2 is set to about 0.8 Vcc, but is not limited thereto. By rendering the state EN to transition to the state NORM when the d-axis voltage command value Vd and the q-axis voltage command value Vq become below the second threshold V2 smaller than the first threshold V1, round trip between these two states can be restricted. Thus, variations in torque and rotation number generally caused by transition of the state can be either reduced or suppressed.

With the above-described configuration, when the closed-loop control is selected (i.e., sel=1) and the field weakening control is activated (i.e., load=0), the integrator 1034 outputs the output value A to render the sum of the d-axis voltage command value Vd and the q-axis voltage command value Vq to match the given value A0 (i.e., Vd+Vq=A0). For example, when the given value A0 is zero (A0=0), the sum of the d-axis voltage command value Vd and the q-axis voltage command value Vq is zero (i.e., Vd+Vq=0).

Here, since the q-axis current command value iqt is the same as the current value itgt (i.e., iqt=itgt) and the d-axis current command value idt is A times of the current value itgt, the output value A is equivalent to a ratio of the q-axis current command value iqt to the d-axis current command value idt (i.e., idt=A×iqt).

In this way, when the field weakening control is activated, the integrator 1034 functions as an adjuster to adjust the ratio A of the d-axis current command value idt to the q-axis current command value iqt to render the sum of the d-axis voltage command value Vd and the q-axis voltage command value Vq to be constant.

For example, in the example of FIG. 21, the sum of the d-axis voltage command value Vd and the q-axis voltage command value Vq is about zero (Vd+Vq=0) in the vicinity of about 2500 rpm. This is a result obtained when the output value A is controlled by the integrator 1034 to be about −0.46 to render the sum to be about zero (Vd+Vq=0) by meeting the equalities (i.e., iqt=0.3 (A), idt=−0.14 (A)=A×iqt).

As described heretofore, according to this embodiment of the present disclosure, the ratio (i.e., the output value) A of the d-axis current command value idt to the q-axis current command value iqt can be controlled to render the sum of the d-axis voltage command value Vd and the q-axis voltage command value Vq to be constant.

With this, a time when each of the d-axis voltage command value Vd and the q-axis voltage command value Vq reaches the power supply voltage value Vcc and is thereby saturated can be delayed. In other words, normally controllable ranges of a rotational speed and load can be widened (i.e., the upper limit is raised) when the closed-loop control is executed.

In addition, since the d-axis current command value idt and the q-axis current command value iqt can be synchronized (with each other), utilization efficiency of a torque of the motor 1 can be upgraded.

Further, according to this embodiment of the present disclosure, the ratio A can be calculated based on the d-axis voltage command value Vd and the q-axis voltage command value Vq without using a specified value such as a motor constant, etc. With this, influence of manufacturing variation of the motor 1 can be suppressed while realizing stable field weakening control.

Since the first selector 103 can be constituted by combining fundamental circuit elements, such as an adder, a subtracter, etc., the first selector 103 can be manufactured at low cost.

Figure 24:
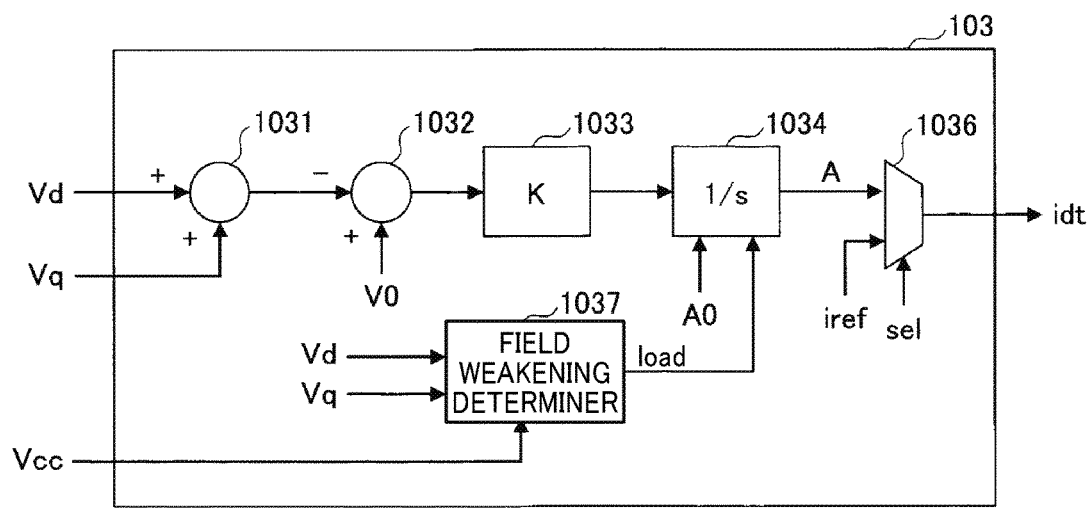
FIG. 24 is a diagram illustrating an exemplary first selector included in the fourth embodiment of the present disclosure.

FIG. 24 is a diagram illustrating another example of the first selector 103 according to one embodiment of the present disclosure.

The first selector 103 of FIG. 24 is a modification of the first selector 103 of FIG. 22. However, the first selector 103 of FIG. 24 excludes the multiplier 1035 of FIG. 22. That is, in the first selector 103 of FIG. 24, the output value A of the integrator 1034 is directly input to the selector 1036. The rest of the configurations of FIG. 24 are similar to those in FIG. 22. That is, the configuration of FIG. 24 is equivalent to a configuration, in which a constant value 1 is input to the integrator 1034 instead of the current command value itgt in FIG. 22.

The first selector 103 of FIG. 24 outputs an output value A as a d-axis current command value idt when the closed-loop control is selected (i.e., sel=1) and the field weakening control is activated (i.e., load=0). That is, the d-axis current command value idt is independent of the current command value itgt. Hence, even when the current command value itgt changes transiently due to disturbance or the like, the configuration of FIG. 24 can reduce the influence of the transient change on the d-axis current command value idt, thus reducing changes in torque and rotational speed.

The field weakening control conducted in this embodiment of the present disclosure can also be executed in a motor driving system that includes a position sensor, such as an optical encoder, a magnetic encoder, etc.

Further, the present disclosure is not limited to the configurations as described heretofore and includes various modifications, such as a combination of the above-described configuration and another element.

According to one embodiment of the present disclosure, multiple control methods of controlling the stepping motor can be effectively switched.

Numerous additional modifications and variations of the present disclosure are possible in light of the above teachings. It is therefore to be understood that within the scope of the appended claims, the present disclosure may be executed otherwise than as specifically described herein. For example, the motor controller is not limited to the above-described various embodiments and may be altered as appropriate. Similarly, the motor driver is not limited to the above-described various embodiments and may be altered as appropriate. Further, the motor driving system is not limited to the above-described various embodiments and may be altered as appropriate.

What is claimed is:

1. A motor controller for controlling a stepping motor, the motor controller comprising:
   a command value calculator to calculate an angle command value based on a reference clock and to calculate a speed command value;
   a control method selector to select one of open-loop control and closed-loop control in accordance with the speed command value calculated by the command value calculator,
   the motor controller being configured to control the stepping motor
      based on a first current command value, upon open-loop control being selected by the control method selector and
      based on a second current command value different from the first current command value, upon closed-loop control being selected by the control method selector; and
   an angle estimating unit to calculate and output an angle estimated value and a speed estimated value based on a driving current supplied to the stepping motor,
      wherein a phase of the driving current supplied to the stepping motor is
      synchronized with the angle command value, upon the open-loop control being selected and executed, and
      synchronized with the angle estimated value, upon the closed-loop control is being selected and executed.

2. The motor controller according to claim 1, further comprising an angle controller
   to calculate a value of the second current command value based on at least the angle command value, the angle estimated value, and the speed estimated value.

3. The motor controller according to claim 1, further comprising an angle controller
   to calculate a value of the second current command value based on the angle command value, the angle estimated value, the speed estimated value, and the speed command value.

4. The motor controller according to claim 1, wherein the control method selector is configured to select closed-loop control upon open-loop control being previously selected and executed and upon the speed command value reaching or exceeding a first speed threshold for a time period, and
   wherein the control method selector is configured to select open-loop control upon closed-loop control being previously selected and upon the speed command value falling below a second speed threshold.

5. A motor driver comprising:
   the motor controller according to claim 1;
   an inverter, connected to the motor controller, to supply the driving current to the stepping motor, connected to the inverter; and
   a current detector to detect the driving current from the inverter.

6. A motor driving system comprising:
   the motor driver according to claim 5; and
   the stepping motor driven by the driving current from the inverter.

7. The motor driving system of claim 6, wherein the stepping motor includes a rotor, and a pair of coils, the rotor including either a permanent magnet arranged in a circumferential direction or a magnetic body magnetized in the circumferential direction.

8. The motor driving system of claim 1, further comprising:
   at least one selector to select the first current command value when open-loop control is selected by the control method selector, and to select the second current command value when closed-loop control is selected by the control method selector.

9. The motor driving system of claim 8, wherein the at least one selector includes a first selector and a second selector, the first selector being configured to receive a first current value and a selection signal and the second selector being configured to receive a second current value and a selection signal, the first selector being configured to select the first current value as the first current command value when open-loop control is selected by the control method selector and the second selector being configured to select the second current value as the second current command value when closed-loop control is selected by the control method selector.

10. A motor controller for controlling a stepping motor, the motor controller comprising:
 a command value calculator to calculate an angle command value based on a reference clock and to calculate a speed command value;
 a control method selector to select one of open-loop control and closed-loop control in accordance with the speed command value calculated by the command value calculator,
 the motor controller being configured to control the stepping motor
  based on a first current command value, upon open-loop control being selected by the control method selector and
  based on a second current command value different from the first current command value, upon closed-loop control being selected by the control method selector;
 a first voltage command value calculator to calculate and output a first voltage command value based on the first current command value; and
 a second voltage command value calculator to calculate and output a second voltage command value different from the first voltage command value based on the second current command value,
 wherein the first current command value renders a sum, of the first voltage command value and the second voltage command value, constant upon closed-loop control being selected and executed and upon at least one of the first voltage command value and the second voltage command value reaching or exceeding a first threshold.

11. The motor controller according to claim 10, wherein the first threshold is determined in accordance with a voltage of a power supply of the stepping motor.

12. The motor controller according to claim 10, wherein the first current command value is a first value upon both the first voltage command value and the second voltage command value falling below a second threshold.

13. The motor controller according to claim 12, wherein the second threshold is relatively lower than the first threshold.

14. The motor controller according to claim 10, wherein a ratio of the first current command value to the second current command value is based on an integrated value obtained by integrating a difference between a second given value and the sum of the first voltage command value and the second voltage command value.

15. A motor driver comprising:
 the motor controller according to claim 10;
 an inverter, connected to the motor controller, to supply the driving current to the stepping motor, connected to the inverter; and
 a current detector to detect the driving current from the inverter.

16. A motor driving system comprising:
 the motor driver according to claim 15; and
 the stepping motor driven by the driving current from the inverter.

17. The motor driving system of claim 16, further comprising:
 the stepping motor, the stepping motor including a rotor, and a pair of coils, the rotor including either a permanent magnet arranged in a circumferential direction or a magnetic body magnetized in the circumferential direction.

18. A motor controller for controlling a stepping motor, the motor controller comprising:
 a memory storing computer-readable instructions; and
  one or more processors configured to execute the computer-readable instructions such that the one or more processors are configured to
   calculate an angle command value based on a reference clock and to calculate a speed command value,
   select one of open-loop control and closed-loop control in accordance with the speed command value calculated, the motor controller being configured to control the stepping motor
    based on a first current command value, upon open-loop control being selected and
    based on a second current command value different from the first current command value, upon closed-loop control being selected;
   calculate and output an angle estimated value and a speed estimated value based on a driving current supplied to the stepping motor, wherein a phase of the driving current supplied to the stepping motor is
    synchronized with the angle command value, upon the open-loop control being selected and executed, and
    synchronized with the angle estimated value, upon the closed-loop control is being selected and executed.

19. A motor driver comprising:
 the motor controller according to claim 18;
 an inverter, connected to the motor controller, to supply driving current to the stepping motor, connected to the inverter; and
 a current detector to detect the driving current from the inverter.

20. A motor driving system comprising:
 the motor driver according to claim 19; and
 the stepping motor driven by the driving current from the inverter.

* * * * *

UNITED STATES PATENT AND TRADEMARK OFFICE
CERTIFICATE OF CORRECTION

PATENT NO. : 10,133,255 B2
APPLICATION NO. : 15/637192
DATED : November 20, 2018
INVENTOR(S) : Haruyuki Suzuki Page 1 of 1

It is certified that error appears in the above-identified patent and that said Letters Patent is hereby corrected as shown below:

On the Title Page

(73) Assignee:
Reads: RICOH COMPANT, LTD. Tokyo (JP)
Should read: RICOH COMPANY LTD., Tokyo, (JP)

Signed and Sealed this
Sixteenth Day of April, 2019

Andrei Iancu
*Director of the United States Patent and Trademark Office*